(12) United States Patent
Chen et al.

(10) Patent No.: US 7,974,084 B2
(45) Date of Patent: *Jul. 5, 2011

(54) MULTI-SECTIONED ARMS FOR PORTABLE ELECTRONIC DEVICES

(75) Inventors: Shaofen Chen, Plano, TX (US); Zhaofang Wen, Plano, TX (US)

(73) Assignee: Computer ErgoTech, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/154,535

(22) Filed: May 24, 2008

(65) Prior Publication Data

US 2008/0232054 A1  Sep. 25, 2008

Related U.S. Application Data

(63) Continuation-in-part of application No. 11/713,269, filed on Mar. 2, 2007, which is a continuation of application No. 11/252,671, filed on Oct. 18, 2005, now Pat. No. 7,215,538, application No. 12/154,535, which is a continuation-in-part of application No. 11/725,294, filed on Mar. 19, 2007, which is a continuation-in-part of application No. 11/252,671, filed on Oct. 18, 2005, now Pat. No. 7,215,538.

(51) Int. Cl.
*G06F 1/16* (2006.01)
*H05K 5/00* (2006.01)
*H05K 7/00* (2006.01)

(52) U.S. Cl. ............................... 361/679.26; 361/679.21

(58) Field of Classification Search .................. 361/681, 361/679.06, 679.21, 679.22, 679.26, 679.27, 361/679.58

See application file for complete search history.

(56) References Cited

U.S. PATENT DOCUMENTS

| | | | | |
|---|---|---|---|---|
| 5,255,214 A | * | 10/1993 | Ma | 361/679.06 |
| 5,347,424 A | * | 9/1994 | Akahane | 361/680 |
| 5,383,138 A | * | 1/1995 | Motoyama et al. | 361/679.27 |
| 5,494,447 A | * | 2/1996 | Zaidan | 361/679.06 |
| 5,548,478 A | | 8/1996 | Kumar et al. | |
| 5,668,570 A | | 9/1997 | Ditzik | |
| 5,805,415 A | | 9/1998 | Tran et al. | |
| 6,005,767 A | | 12/1999 | Ku et al. | |
| 6,016,171 A | * | 1/2000 | Tsao | 361/679.27 |
| 6,134,103 A | | 10/2000 | Ghanma | |
| 6,233,138 B1 | | 5/2001 | Osgood | |
| 6,262,885 B1 | | 7/2001 | Emma et al. | |
| 6,353,529 B1 | | 3/2002 | Cies | |
| 6,381,128 B1 | | 4/2002 | Kramer | |
| 6,392,877 B1 | | 5/2002 | Iredale | |
| 6,430,038 B1 | | 8/2002 | Helot et al. | |

(Continued)

*Primary Examiner* — Jayprakash N Gandhi
*Assistant Examiner* — Adrian S Wilson

(57) ABSTRACT

Multi-sectioned arms are used as a basic mechanism for coupling the display and the base of a portable electronic device. With this mechanism, one single portable electronic device can support all of the following capabilities. The display can move continuously, relative to the back edge of the base, along any combination of up and down, left and right, and forward and backward directions. The display can be tilted up and down as well as sideways and also set to portrait and landscape orientations. The base can be tilted forward for typing comfort and better heat dispersion. There is also an anti-tipping mechanism. When the display is in conventional open or close positions, each arm can be folded and parked alongside, parallel to, and away from the edge of the base. The arms can be detached from the computer. The base and the display can overlay each other in four ways.

24 Claims, 18 Drawing Sheets

U.S. PATENT DOCUMENTS

| | | |
|---|---|---|
| 6,437,973 B1 | 8/2002 | Helot et al. |
| 6,464,195 B1 | 10/2002 | Hildebrandt |
| 6,480,373 B1 | 11/2002 | Landry et al. |
| 6,504,707 B2 | 1/2003 | Agata et al. |
| 6,532,147 B1 | 3/2003 | Christ, Jr. |
| 6,639,788 B1 * | 10/2003 | Liao et al. ............ 361/679.22 |
| 6,665,175 B1 | 12/2003 | deBoer et al. |
| 6,700,773 B1 | 3/2004 | Adriaansen et al. |
| 6,816,365 B2 | 11/2004 | Hill et al. |
| 6,826,043 B2 * | 11/2004 | Chang ................ 361/679.27 |
| 6,912,121 B2 | 6/2005 | Karidis et al. |
| 6,947,279 B2 | 9/2005 | Cheng et al. |
| 7,215,538 B1 * | 5/2007 | Chen et al. ................ 361/683 |
| 7,296,774 B2 * | 11/2007 | Oh ................ 248/324 |
| 7,333,323 B1 * | 2/2008 | Dawson et al. ........... 361/681 |
| 2001/0017761 A1 * | 8/2001 | Ditzik ................ 361/681 |
| 2004/0057197 A1 | 3/2004 | Hill et al. |
| 2004/0066614 A1 * | 4/2004 | Hong ................ 361/681 |
| 2004/0114319 A1 | 6/2004 | Hill et al. |
| 2004/0165342 A1 * | 8/2004 | Chang ................ 361/681 |
| 2006/0185563 A1 | 8/2006 | Sweere et al. |
| 2006/0279920 A1 * | 12/2006 | Lee et al. ................ 361/683 |

* cited by examiner

FIG.1
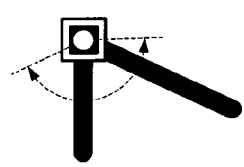
FIG.2A
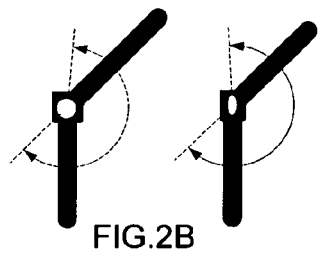
FIG.2B
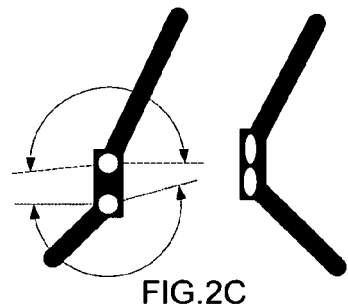
FIG.2C
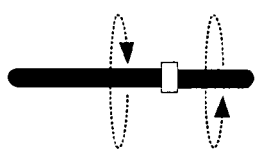
FIG.2D
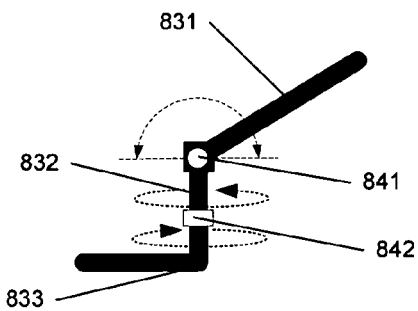
FIG.2E
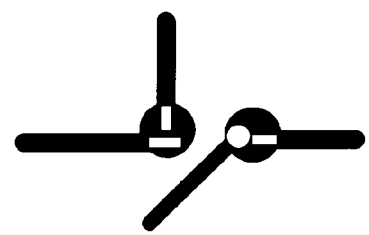
FIG.2F
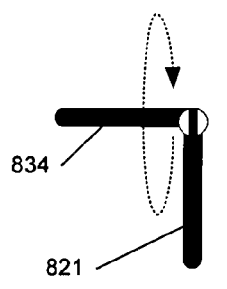
FIG.2G
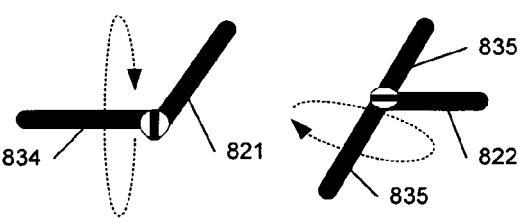
FIG.2H
FIG.2

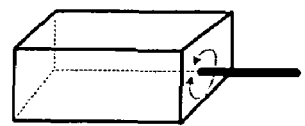
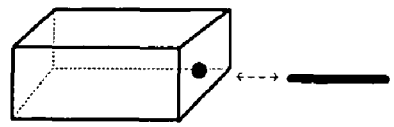
FIG.3A  FIG.3B
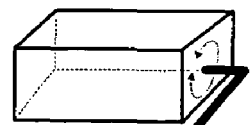
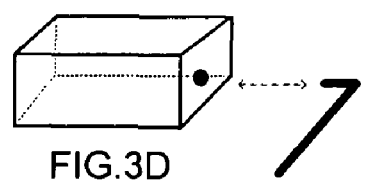
FIG.3C  FIG.3D
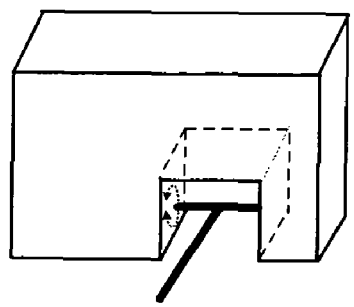
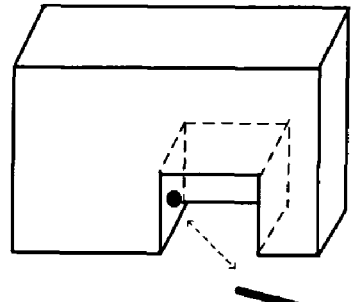
FIG.3E  FIG.3F
FIG.3
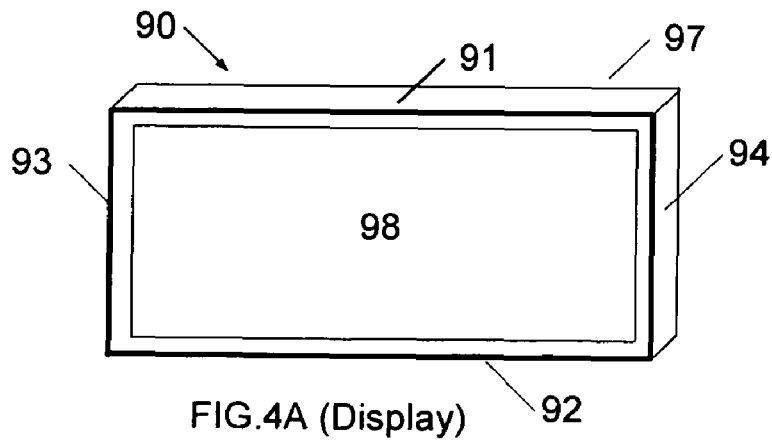
FIG.4A (Display)
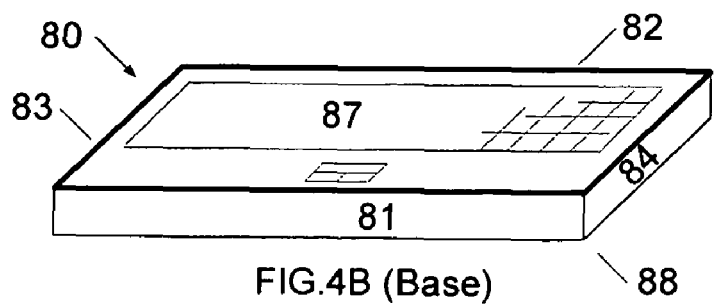
FIG.4B (Base)
FIG.4

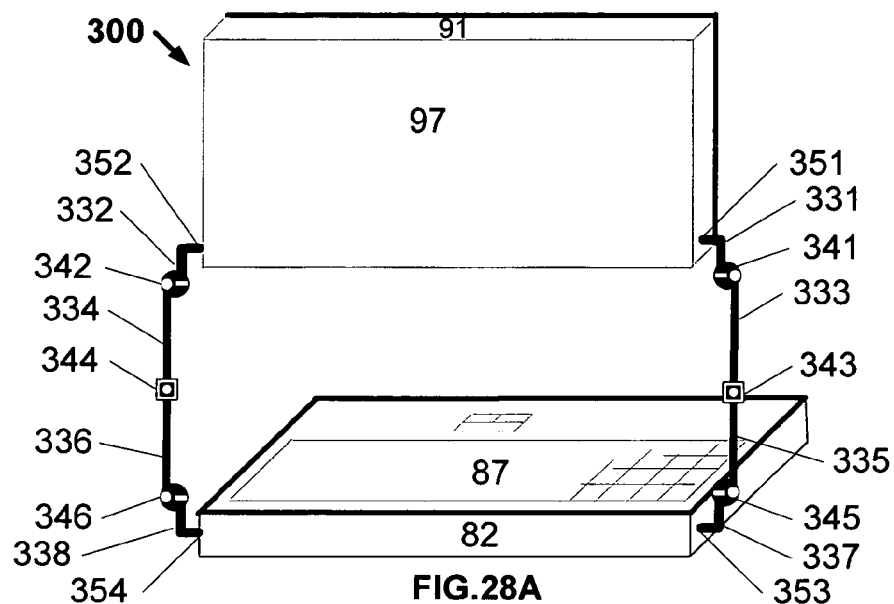
FIG. 28A
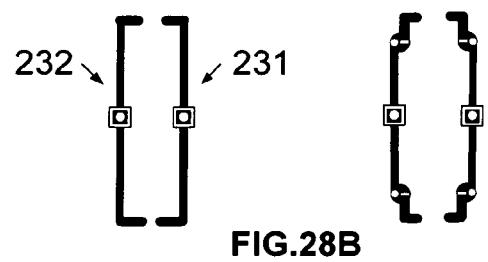
FIG. 28B
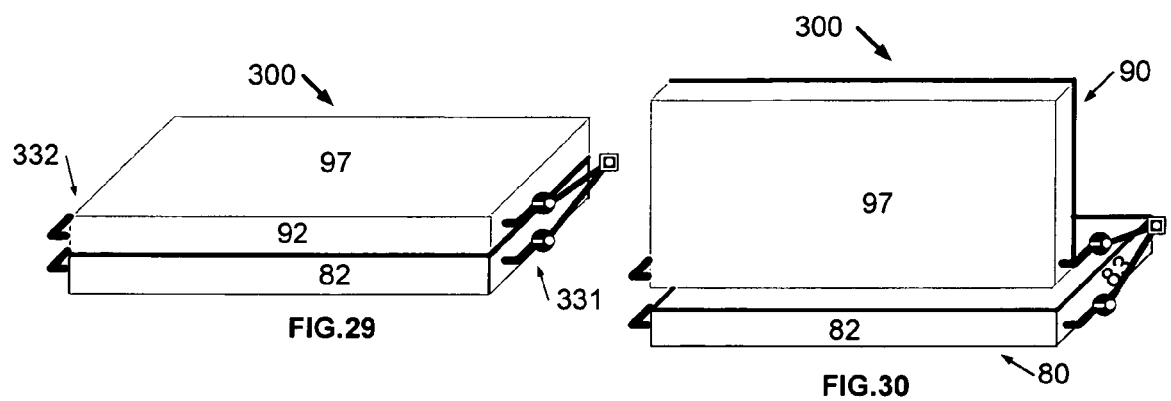
FIG. 29
FIG. 30

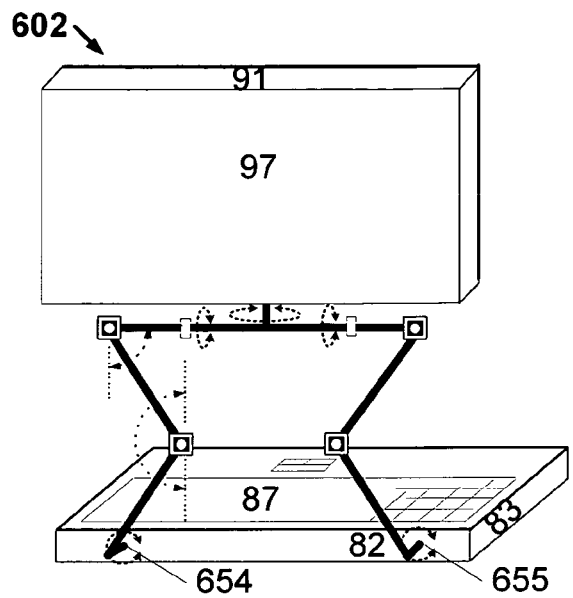
FIG. 47
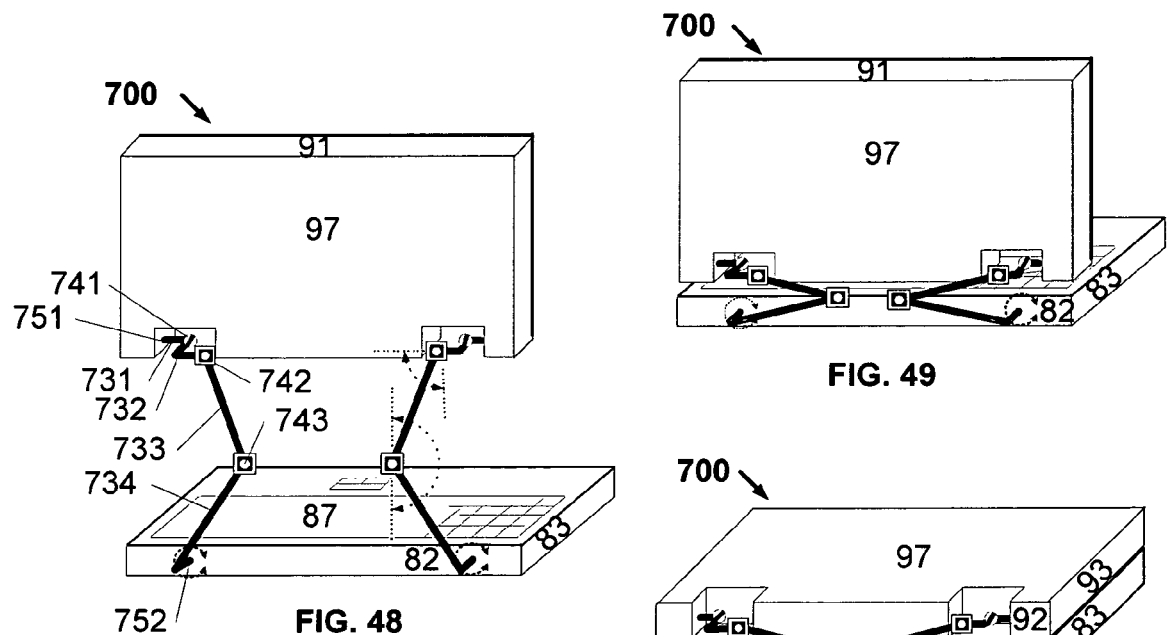
FIG. 48
FIG. 49
FIG. 50

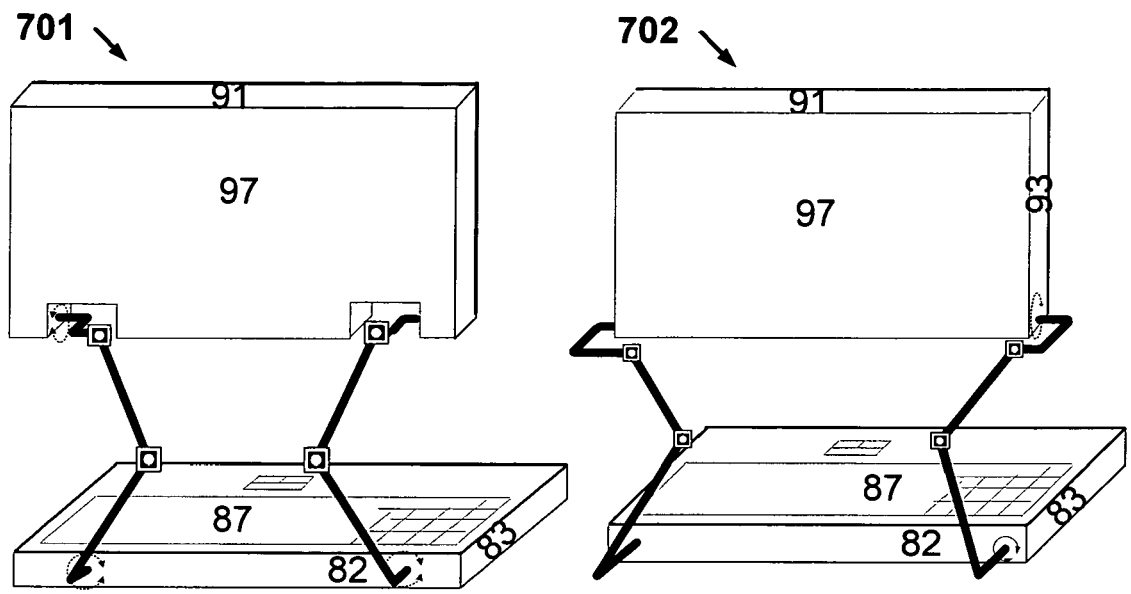
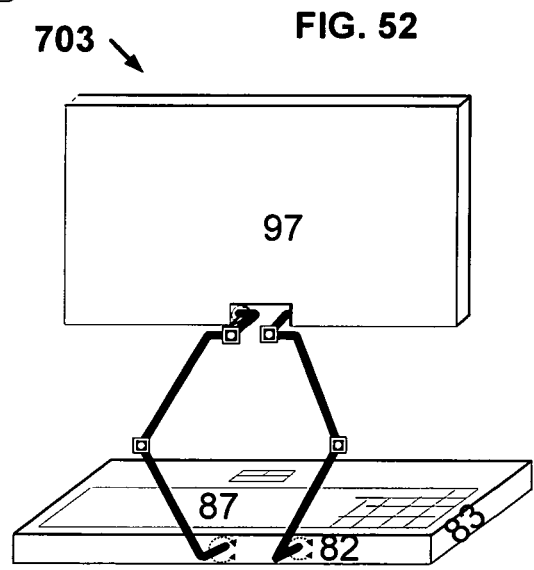
FIG. 51
FIG. 52
FIG. 53

MULTI-SECTIONED ARMS FOR PORTABLE ELECTRONIC DEVICES

CROSS-REFERENCE TO RELATED APPLICATIONS

This application is a continuation-in-part application of and claims priority from the following patent applications:
1) U.S. patent application Ser. No. 11/713,269, filed on Mar. 2, 2007, which is a continuation application of U.S. patent application Ser. No. 11/252,671, filed on Oct. 18, 2005, now issued as U.S. Pat. No. 7,215,538, entitled "Portable Computer with Multi-Sectioned Arms to Support Display Position Adjustment and Multiple Configurations", and
2) U.S. patent application Ser. No. 11/725,294, filed Mar. 19, 2007, entitled "Multi-sectioned arm for portable electronic devices", which is a continuation-in-part application of U.S. patent application Ser. No. 11/252,671, filed on Oct. 18, 2005, now issued as U.S. Pat. No. 7,215,538.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISC APPENDIX

Not Applicable

FIELD OF THE INVENTION

The present invention generally relates to a computer and other electronic devices. More specifically, the invention relates to portable computers having an adjustable display.

BACKGROUND

Technological advancements have enabled portable computers to be built in various forms such as notebooks, tablet PC, personal digital assistants (PDA), and even video game players, and portable DVD players. In this patent application, we use the following terms "portable computer", "portable electronic device", and "portable computing device" interchangeably to refer to these various forms, to which the present invention is not only applicable individually but useful in unifying some of them into one single portable computer with multiple configurations.

A portable computer typically comprises a base and a screen. The computer base generally holds the central processing unit (CPU), memory, electronic circuitry and other components, such as a keyboard, a disk drive. Typically, the base is hinged to the display in a manner in which the display folds down on the base, as shown by the computer (900) in FIG. 5. This design is referred to as the clam shell type enclosure. The display screen is typically connected to the base in such a way that the screen is hidden when the clam shell is closed. That is, the screen faces the upper side (typically, the keyboard) of the base.

There are several disadvantages of the clam shell design. One disadvantage is that the screen and the keyboard are next to each other. If the screen is placed at a comfortable viewing position, it will make the arms and shoulders uncomfortable for typing. On the other hand, if the computer is placed at a comfortable typing position, it would make the neck uncomfortable when looking at the screen. This problem can cause serious computer-related work injuries. Another disadvantage is that it needs to have sufficient room to fully open the clam shell computer and position the display screen at an angle of about ninety (90°) or more with respect to the base for normal viewing; and this can be very difficult when operating in tight space, such as on the pull-out tray on the back of a declined airplane seat. Therefore, the clam shell design is insufficient for comfortable use.

In general, it is useful to be able to arrange a single portable computer into various configurations as follows.
(1) Improved Notebook configuration: The display screen can be adjusted to a desirable viewing angle, and to a position by height (up or down relative to the base) and by depth (forward or backward relative to the base's user edge).
(2) Shared viewing configuration: This is configuration (1) plus display adjustment by width (left or right of the space above the keyboard). In addition, this configuration allows the display to tilt left and right relative to the usage orientation of the keyboard. This configuration can be useful when more than one people are looking at the screen at the same time.
(3) Tablet PC configuration: The portable computer is closed with the base stacked underneath the upward-facing screen to be used as input pad. (The keyboard in this configuration can either be facing down or up; but it does not matter.)
(4) Stylus input configuration: The portable computer is open with screen up in normal viewing position; but the bottom side (opposite to the keyboard) of the base is up and used as input pad.
(5) Space saving configuration: The portable computer is closed with the display stacked underneath the base, so that the base can be used as a desktop machine together with a desktop display unit, typically with a bigger and better screen.
(6) Desk note configuration: The display is completely detached from the base so that the base can be used as a desktop machine together with a desktop display unit. (Both this configuration and the Space saving configuration can get the built-in display out of the way of the desktop monitor screen.)
(7) Flexible display orientation configuration: The display screen supports both portrait and landscape viewing orientations.

There have been numerous attempts to support various subsets of these seven configurations. Many of them are focused on the screen viewing position adjustment using various approaches, which are all different from the multi-sectioned arm approach in the present invention. Some others are focused on mode transitioning between conventional notebook and tablet PC. There has been no single invention until now that can solve all seven configurations in a single computer.

The purpose of the present invention is to devise a basic mechanism for supporting all or a select subset of configurations (1)-(7) in one single portable computer.

SUMMARY

The present invention supports, in one single portable computer, all or a subset of configurations (1)-(7) as specified in the Background Section.

A portable computer according to the present invention generally includes a computer base and a display, which are connected together through one or more multi-sectioned arms. Such a multi-sectioned arm includes rotatably linked sections. The electronic and electric wiring cable between the base and the display can run completely inside one or more of the arms. The wiring cable can also run separately without going through the arm (or arms); and in this case, a coiled or retractable cable may be used.

The connection ("arm connection") for linking an arm to the display or the base can either be a pivotal hinge (connection pivot) or a mounting mechanism as simple as a tunnel to receive an end section of the arm. In either case, the screen's viewing angle can be adjusted, either by rotating the display around the connection pivots (if any), or by turning some of the arm sections relatively to each other.

The arms can be folded and parked alongside the portable computer when the display and the base are folded together. At the conventional screen viewing position, the folded arms can be turned away so that they do not block the computer base's edges for other uses, such as DVD, network card, and other outlets.

The arms can also be flexibly stretched to allow continuous adjustment of the screen's spatial position by height (up or down relative to the base), depth (forward or backward relative to the base's user edge), and width (left or right away from space above the base). The viewing angle of the screen can be tilted up and down. When open in an upright position, the screen can also be tilted left and right. (See configurations (1) and (2) in the Background section.)

To see the range of screen position adjustment, consider the position of the middle point of the lower edge of the display, relative to the back edge of the base. In the conventional clam shell design (as shown in FIG. 5), this mid-point travels along a pre-determined curve with a semi-diameter about the height of the hinge connection between the base and the display. In contrast, a portable computer according to the present invention can allow such a mid-point to travel in a (3-dimensional) range with a diameter about the height of the fully stretched multi-sectioned arm (or arms).

By rotating the arm sections and by arranging how the display and the base face each other the portable computer can be set to Configurations (1)-(5). The display can also be set to Configuration (7), i.e., landscape and portrait viewing orientations, and even some slanted orientation. The arms can be detached completely from both the computer base and the display. This not only allows for the computer to be set for the desk note configuration (6), but also makes the arms replaceable or substitutable. Alternatively, some of the configurations can be obtained by detaching the arms, rearranging the arms, the display, and the base, and then re-attaching the arms (if necessary).

A portable computer according the present invention can selectively include following mechanisms:

Stabilizing mechanisms can be used to maintain the chosen relative positions of the arm sections, the base, and the display.

Rotation-limiting mechanisms can be included at some of the joints and connection pivots for limiting how much the attached arm sections can rotate or turn. (This can prevent potential wiring and other damages from unlimited rotating and turning.)

A locking mechanism can be included to prevent the base and the display from unintentional separation when they folded together.

An anti-tipping mechanism can be included to prevent the computer from tipping over (falling backward undesirably).

A base-tilting mechanism can be included for base lifting and forward tilting to improve typing comfort and heat dispersion.

For illustration, several embodiments of the computer according to this invention are presented, based on the numbers of arms and sections in each arm as well as how the each arm is connected to the computer base and the display. For simplicity of presentation, drawings of these embodiments are done using several notations representing basic parts such as arm sections and ways for linking them. These basic parts and notations are easily implementable with current manufacturing capabilities in the mechanical engineering industry; and it is important to point out that the present invention is not limited to any particular mechanical implementations of these basic parts and notations.

Typically, the computer base has two sides and four edges: the keyboard side, the bottom side (opposite to the keyboard), the left edge, right edge, the front edge (user edge), and the back edge. The display also has two sides and four edges: the screen side, the back side (opposite to the screen), the left and right edges, and the upper and lower edges (from the user's point of view). (Note: These features of the base and the display are listed for convenience in the presentation. The present invention is not limited to portable computers having exactly these features.)

In the first embodiment, one single multi-sectioned arm is connected to the lower edge of the display and the back edge of the base. In the second embodiment, two double-sectioned arms connect the base and the display by their side edges, with one on the left and the other on the right. The third embodiment is an extension of the second embodiment by replacing the two-sectioned side arms with side arms using combo-joints, thus enabling the display to move sideways (left and right relative to the base). In the fourth embodiment, a bridge arm anchors on the left and the right edges of the computer base, and connects to the lower edge of the display. The fifth embodiment is an extension of the second embodiment by using triple-sections arms.

In additions, we present several embodiments that have a special feature: the motion for tilting the screen viewing angle and the motion for lifting the display relative to the base are basically independent, because the rotational axis for supporting these two motions are non-parallel to each other. (In fact, they are about perpendicular to each other.) This special feature makes the arm mechanisms simple to implement and easy to use.

In the presentations of the embodiments, some variations are also mentioned.

In summary, all or a subset of configurations (1)-(7) can be supported in one single computer with multi-sectioned arms according to the present invention.

BRIEF DESCRIPTION OF THE DRAWINGS

Drawing Notations

FIG. 1 is a list of notations used in the drawings to represent one of the sections in a multi-sectioned arm in various scenarios.

FIGS. 2A-2H is a list of notations used in the drawings to show some of the possible relative rotations of the arm sections that are linked together.

FIGS. 3A-3F is a list of notations in various scenarios an arm can be attached to and detached from the base and the display.

FIG. 4 lists the base and the display of a portable computer. In the drawings of all the embodiments, the base and the display will always use the same labels. (FIG. 4A denotes the display of a portable computer. FIG. 4B denotes the base of a portable computer.)

First Embodiment

Figure 5:
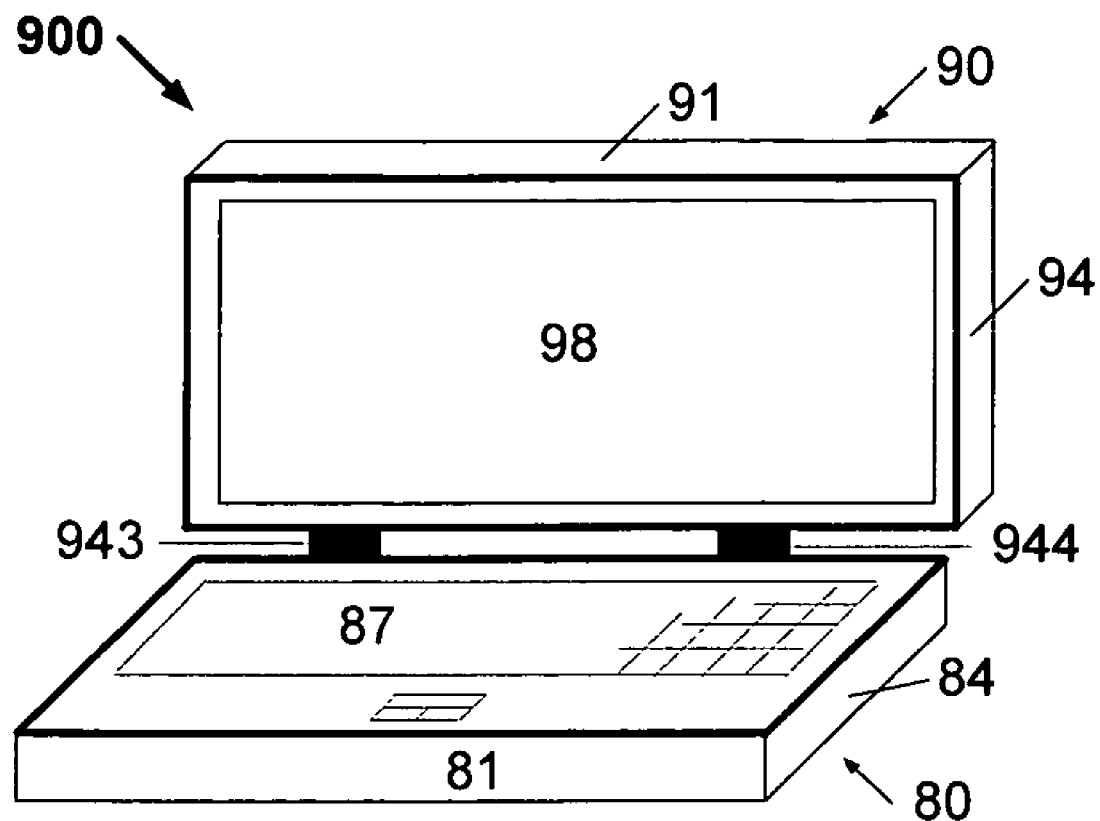
FIG. 5 is a perspective view of a conventional clam shell enclosure design of a portable computer, in an open position.
Figure 6A:
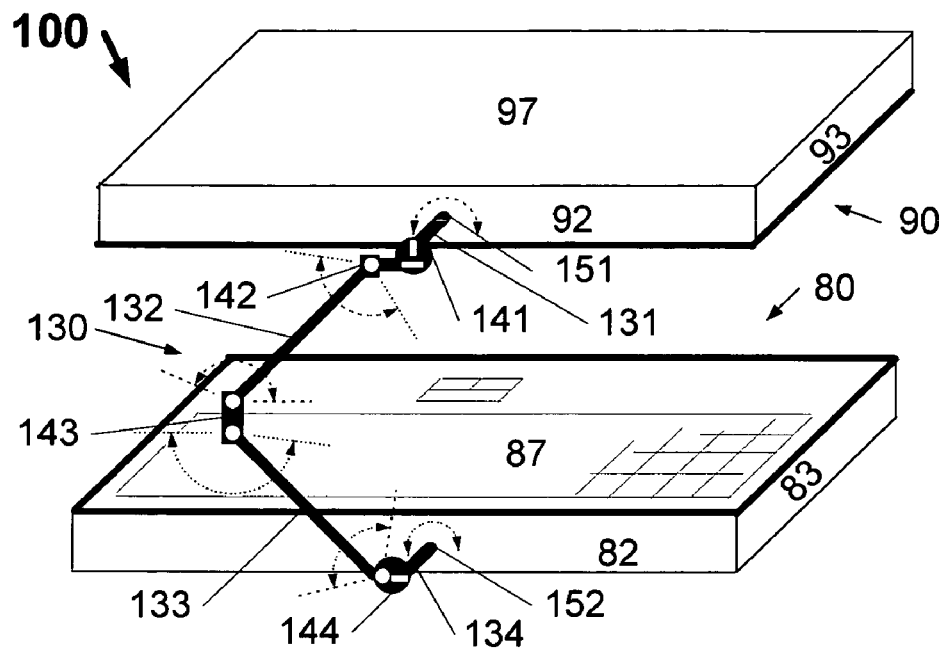

FIG. 6A is a perspective view of the first embodiment of the computer (100) of the present invention with a single back multi-sectioned arm, in a partially open position.

Figure 6B:
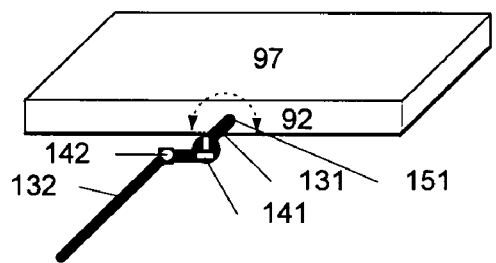

FIG. 6B is a split view of the top portion of the arm connected to the display of computer 100.

Figure 6C:
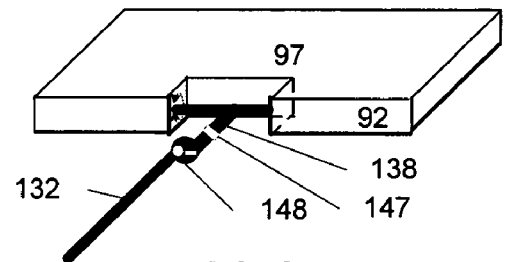

FIG. 6C is a possible substitute for the top portion of computer 100 as shown in FIG. 6B.

Figure 6D:
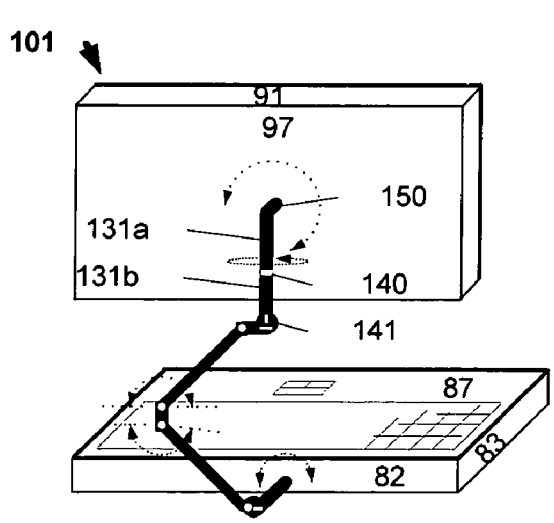

FIG. 6D is a variation of computer 100 to support both portrait and landscape orientations of the display.

Figure 6E:
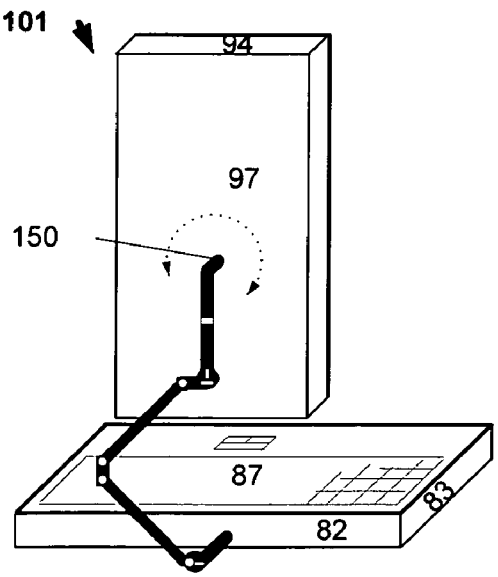

FIG. 6E is a perspective view of the computer in FIG. 6D when the display is set to the portrait orientation.

Figure 7:
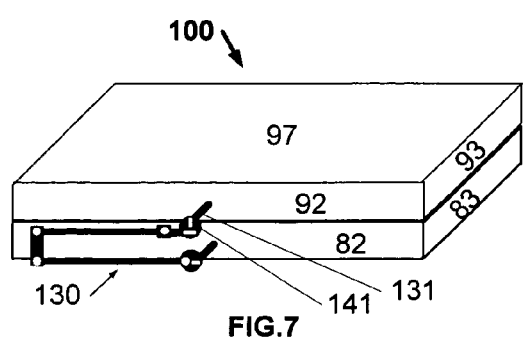

FIG. 7 is a perspective view of computer 100 in a closed position. The arm is folded and parked alongside and parallel to the back edge of the base.

Figure 8:
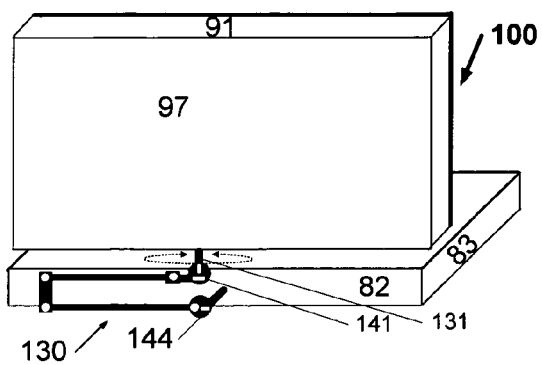

FIG. 8 is a perspective view of computer 100 in a conventional open position, with the folded arm parked alongside and parallel to the back edge (82) of the base.

Figure 9:
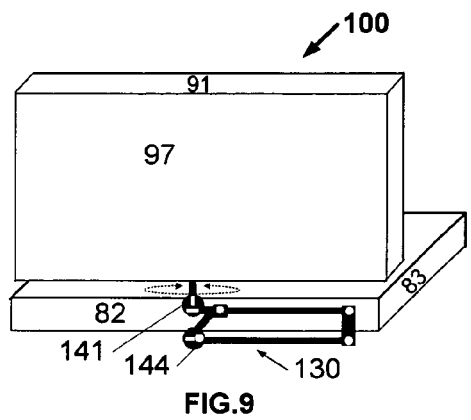

FIG. 9 is a perspective view of computer 100 in a conventional open position with the folded arm parked alongside and parallel to the back edge (82) of the base.

Figure 10:
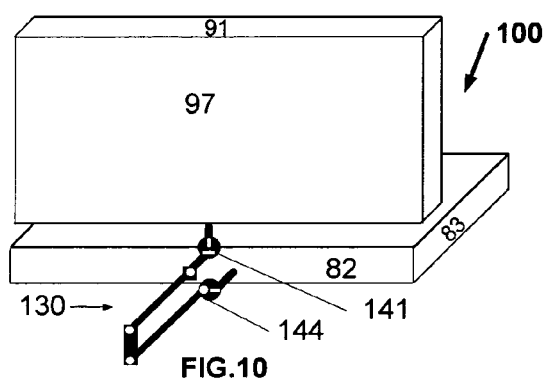

FIG. 10 is a perspective view of computer 100 in a conventional open position, with the folded arm placed away from the base's back edge 82.

Figure 11:
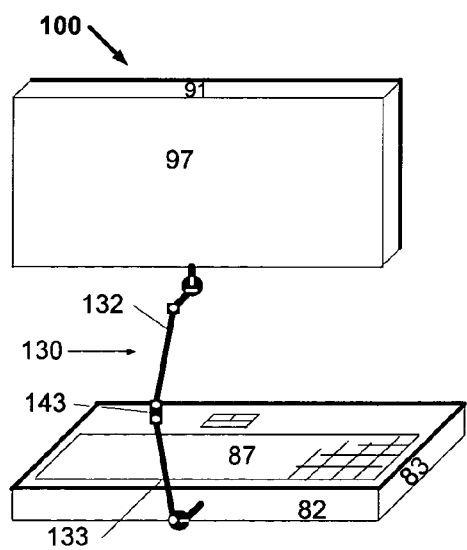

FIG. 11 is a perspective view of computer 100 in a position where the display is up-lifted, screen facing the user, and the arm being away from the back edge 82 of the base.

Figure 12:
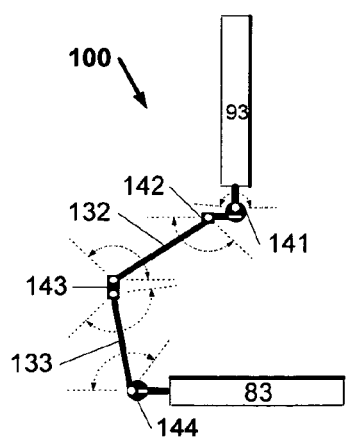

FIG. 12 is a perspective left side view of computer 100 in an opened, screen-up position, where the screen is away from its conventional vertical position towards the user.

Figure 13:
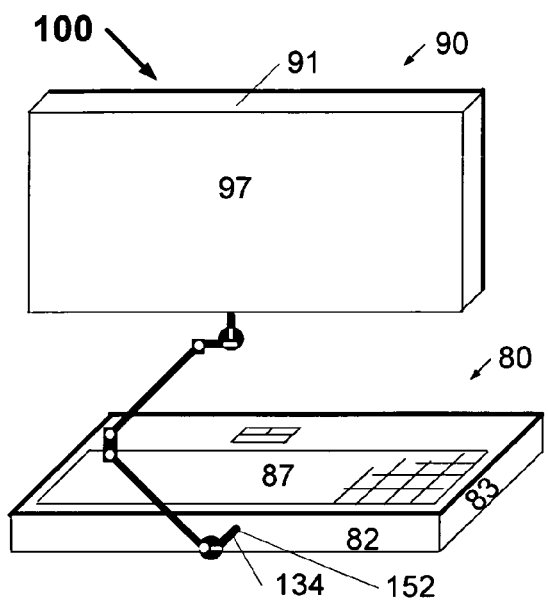

FIG. 13 is a perspective view of computer 100 in an opened, screen-up position.

Figure 14:
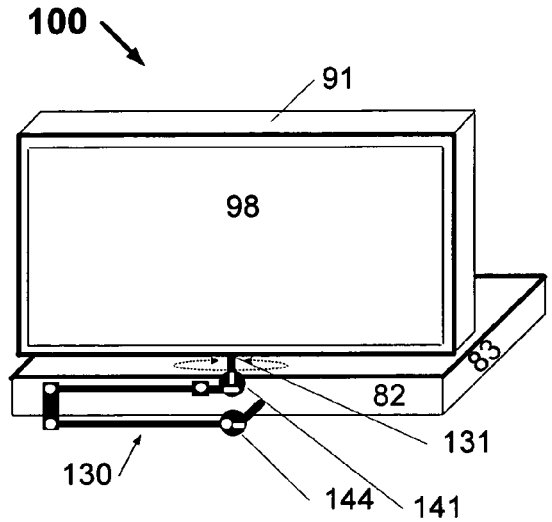

FIG. 14 is a perspective view of computer 100 in an opened, screen-up and backward facing position, with the folded arm parked alongside and parallel to the back edge (82) of the base.

Figure 15:
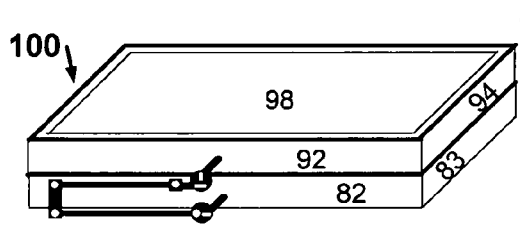

FIG. 15 is a perspective view of computer 100 in a closed position with viewing screen 98 facing upward (for the tablet PC configuration).

Figure 16:
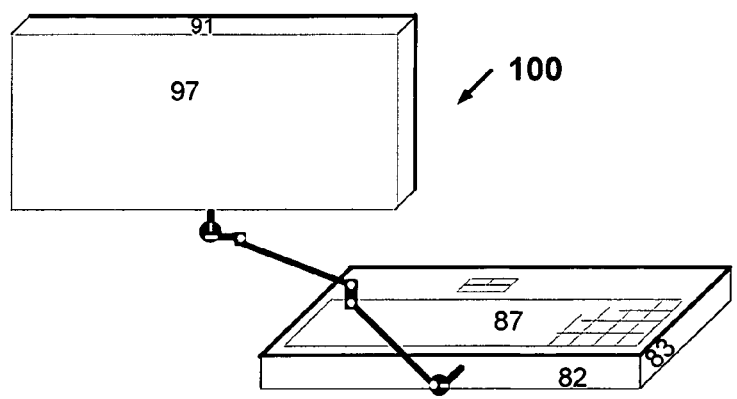

FIG. 16 is a perspective view of computer 100 in an open position in which the viewing screen 98 is facing the front, and the whole display is lifted and positioned towards to the right edge of the user (suitable for view sharing.)

Figure 17:
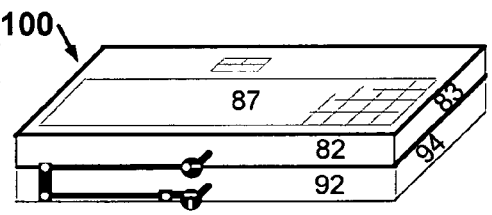

FIG. 17 is a perspective view of computer 100 in a closed position with the base sitting on top of the display (for the space-saving configuration).

Second Embodiment

Figure 18:
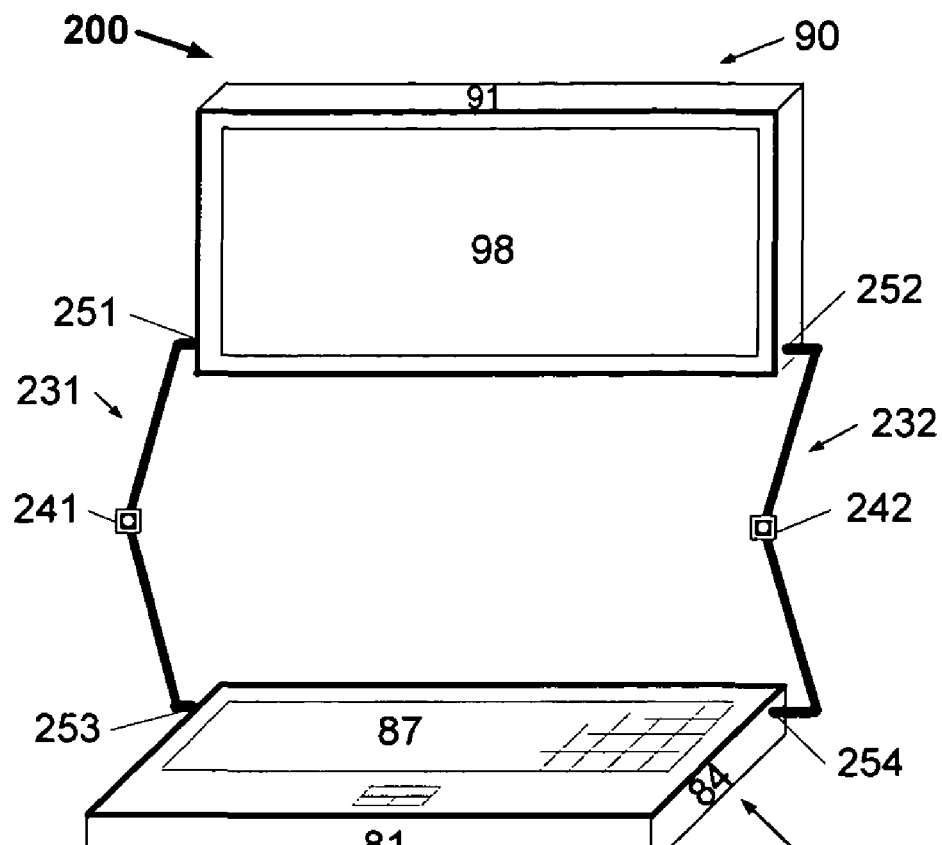

FIG. 18 is a perspective view of the portable computer (200) of the second embodiment of the present invention with two double-sectioned side arms. It is in a position where the screen is lifted and facing the user.

Figure 19:
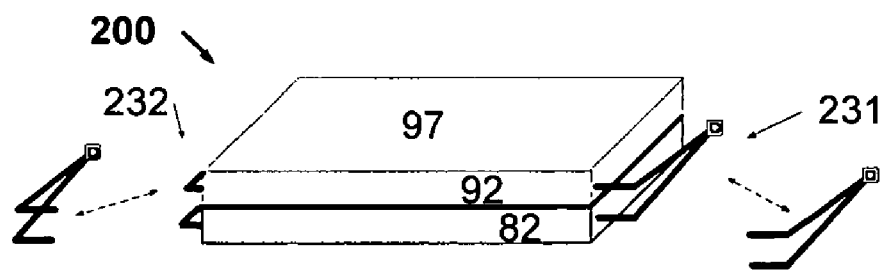

FIG. 19 is a perspective view of computer 200 in a closed, arms folded position. It also shows how the arms can be detached.

Figure 20:
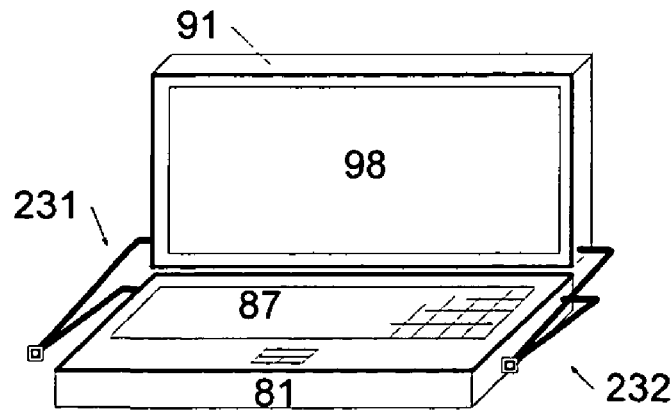

FIG. 20 is a perspective view of computer 200 in conventional open position.

Figure 21:
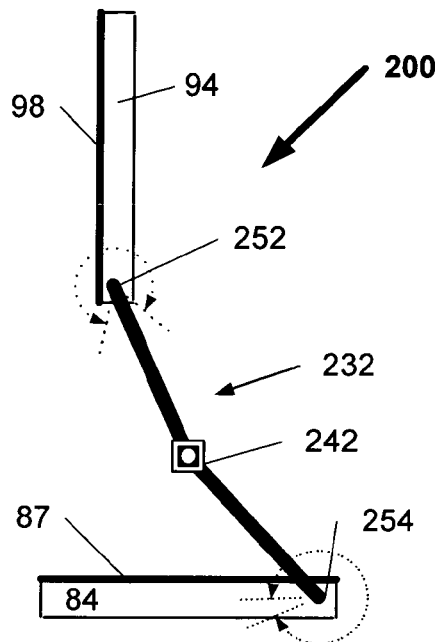

FIG. 21 is perspective side view of computer 200 in a position with the screen up-lifted and faced forward.

Figure 22:
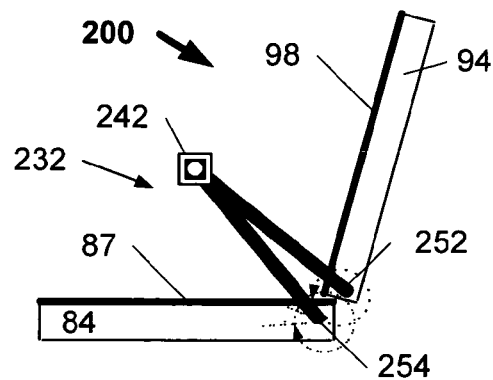

FIG. 22 is a perspective side view of computer 200 in a conventional open position with arms folded and lifted up to avoid blocking side edge 84 of the base for other uses such as a DVD player and other outlets.

Figure 23:
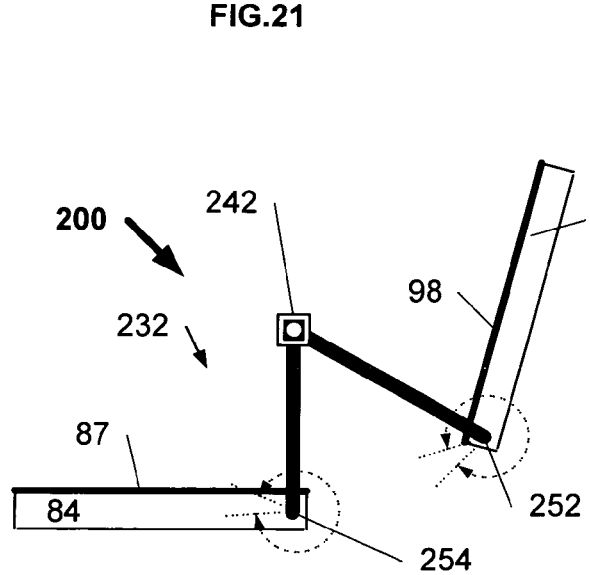

FIG. 23 is a perspective side view of computer 200 in an unconventional open position with arms partially stretched to reach behind the back edge of the base.

Figure 24:
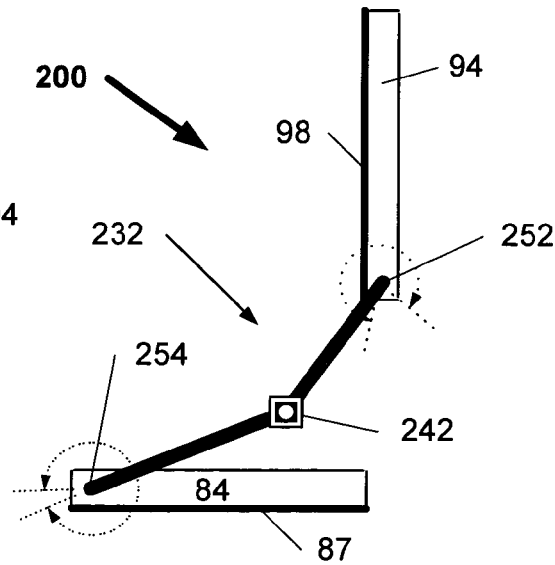

FIG. 24 is a perspective side view of computer 200 in an open position with display 90 up-lifted and the keyboard faced down (for the stylus configuration (4)).

Figure 25:
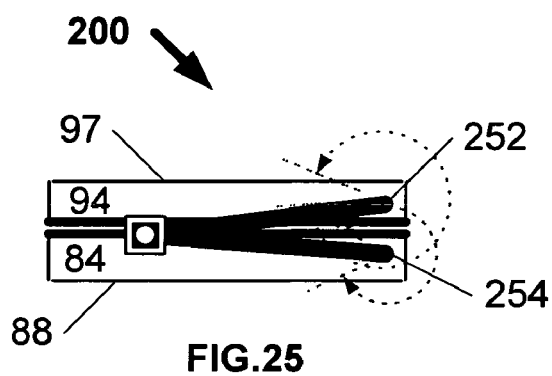

FIG. 25 is a perspective side view of computer 200 in a closed position with arms folded and screen facing the keyboard.

Figure 26:
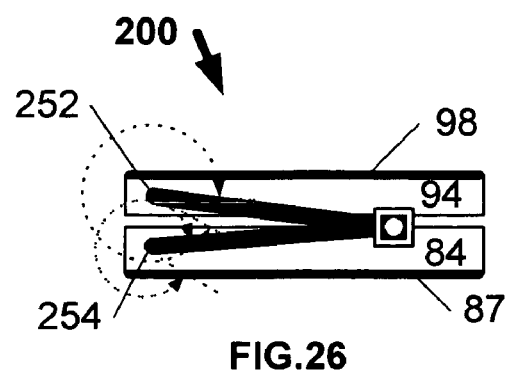

FIG. 26 is a perspective side view of computer 200 in a closed position with arms folded, screen facing up, and the base stacked underneath the display. (This is a version of the tablet PC configuration.)

Figure 27:
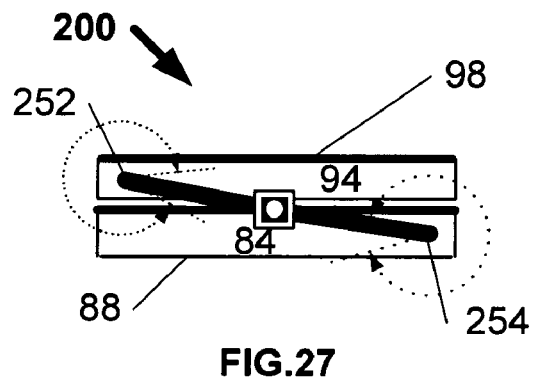

FIG. 27 is a perspective side view of computer 200 in a closed position with arms folded and screen facing up.

Third Embodiment

FIG. 28A is a perspective view of a portable computer (300) of the third embodiment of the present invention.

FIG. 28B is a split view of arms 231 and 232 of computer 200 (as shown in FIG. 18) and an alternative pair of arms. Substituting the arms leads to the third embodiment of the present invention as shown in FIG. 28A.

FIG. 29 is a perspective view of portable computer 300 in a closed position, with the arms folded and parked alongside the left and right edges of the base.

FIG. 30 is a perspective view of portable computer 300 in a conventional open position, with arms folded and parked alongside the left and right edges of the base (80).

Figure 31:
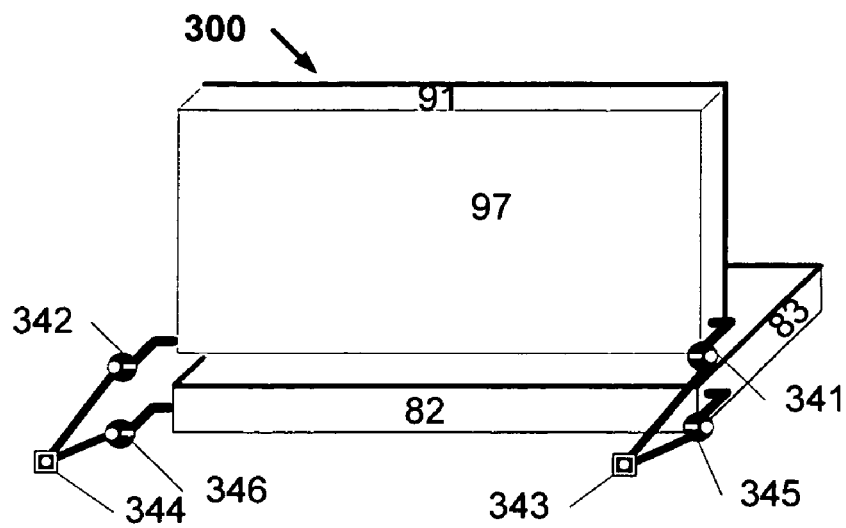

FIG. 31 is a perspective view of portable computer 300 in an open position, with arms folded and reached out from the back of the computer.

Figure 32:
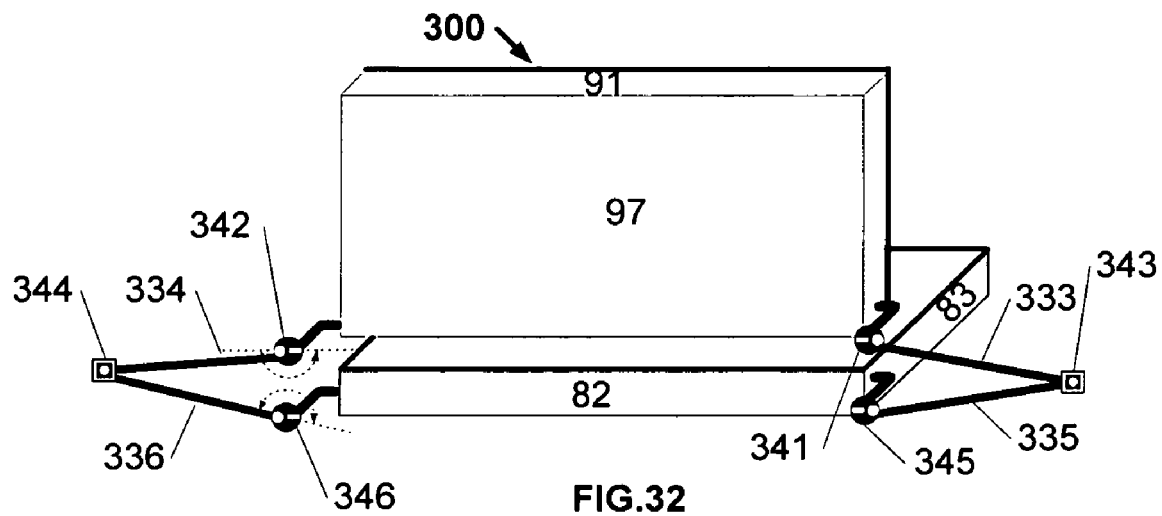

FIG. 32 is a perspective view of portable computer 300 in an open position, with arms folded, reached out first from the back of the computer, and then turned sideways, away from the computer.

Figure 33:
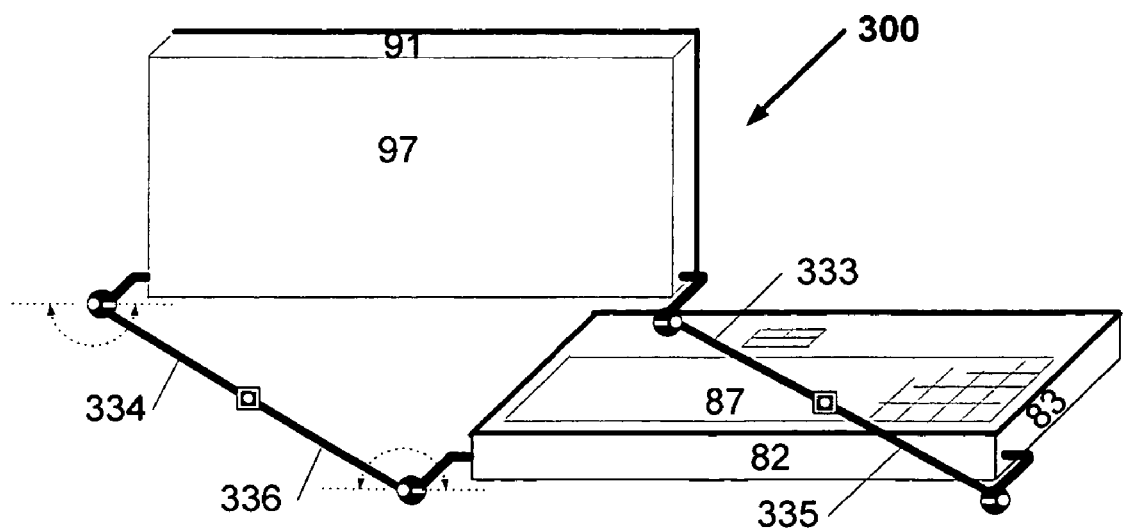

FIG. 33 is a perspective view of portable computer 300 in an open position, with arms stretched, and with the display up-lifted and reached out towards the right hand side of the computer (from the user's point of view.)

Fourth Embodiment

Figure 34A:
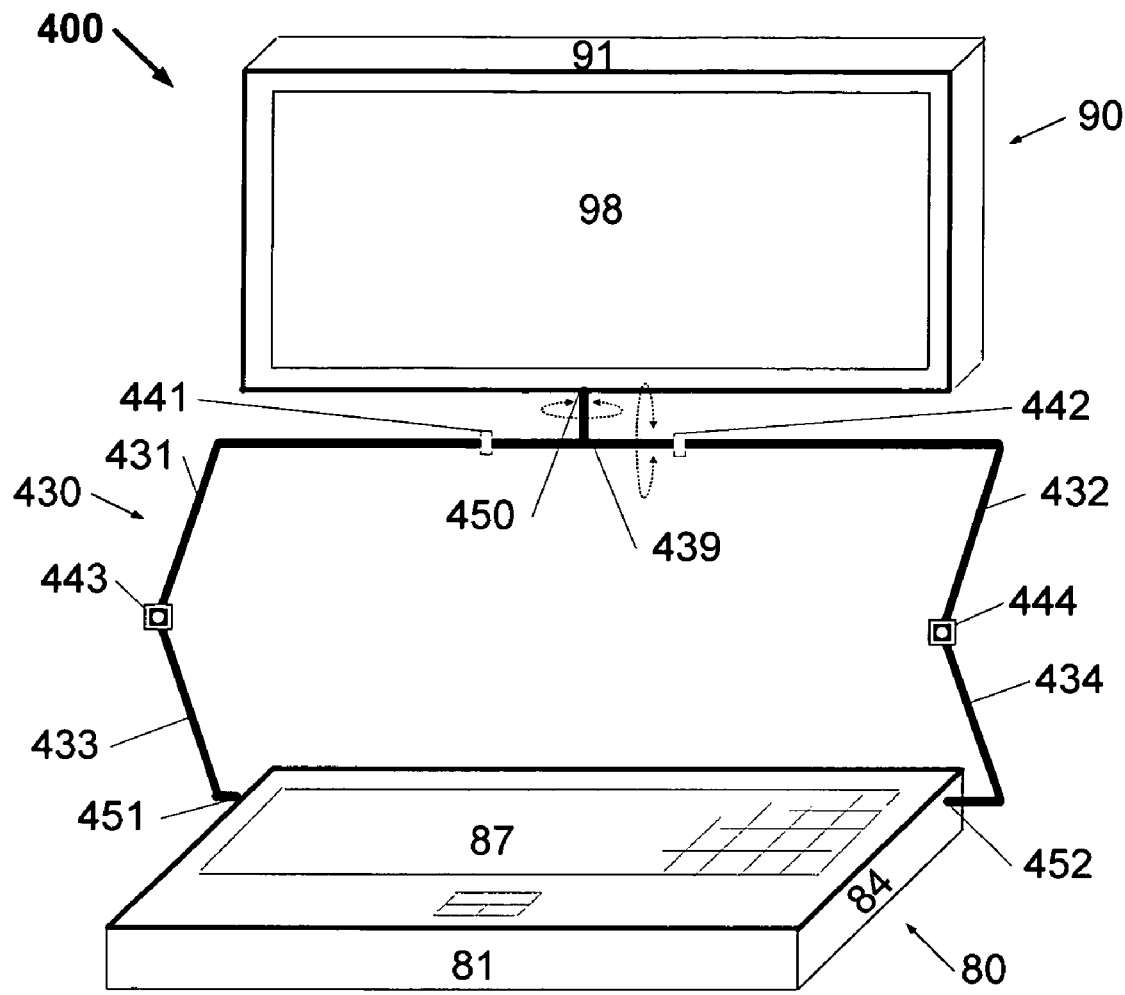

FIG. 34A is a perspective view of the portable computer (400) of the fourth embodiment of the present invention. This embodiment has one multi-sectioned bridge arm. It is in a position where the screen is lifted and facing the user.

Figure 34B:
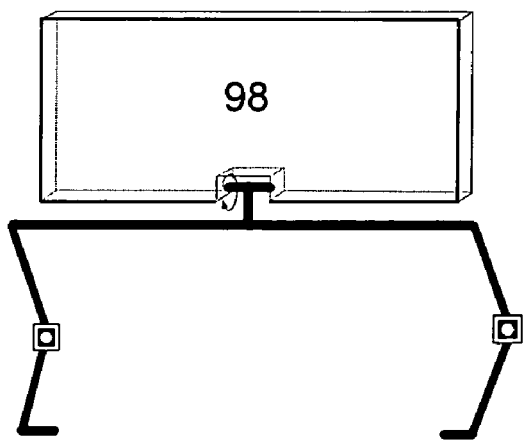

FIG. 34B shows is a partial view of a variation that replaces the display and the bridge arm of computer 400.

Figure 34C:
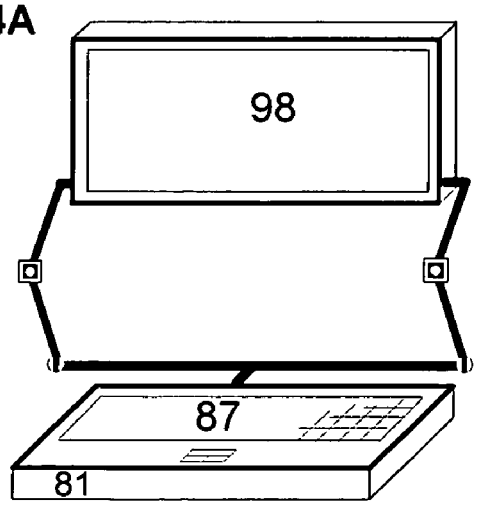

FIG. 34C shows a variation of computer 400. In the variation, the bridge arm connects to the back edge of the base and to the left and right edges of the display.

Figure 35:
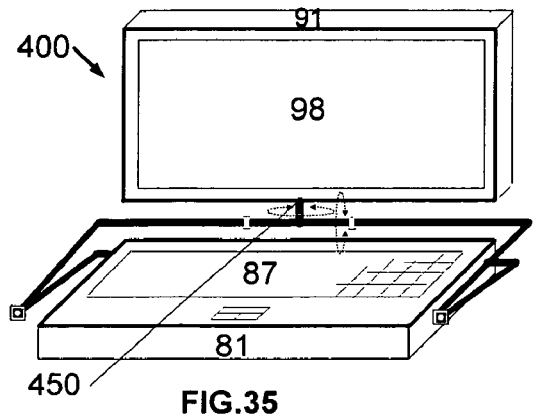

FIG. 35 is a perspective view of computer 400 in the conventional open position.

Figure 36:
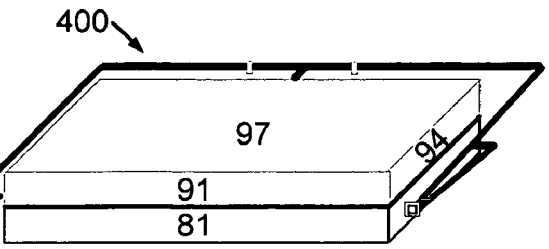

FIG. 36 is a perspective view of computer 400 in the conventional closed position.

Figure 37:
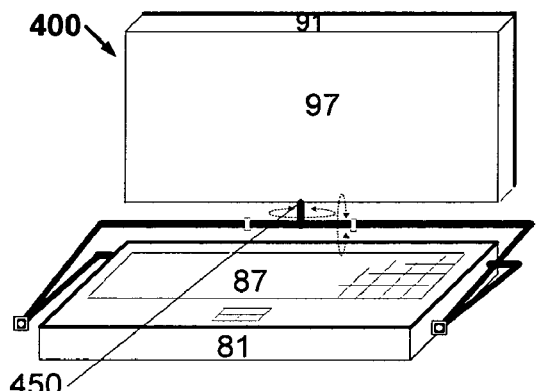

FIG. 37 is a perspective view of computer 400 in an open position with the arm folded and the screen facing away from the user.

Figure 38:
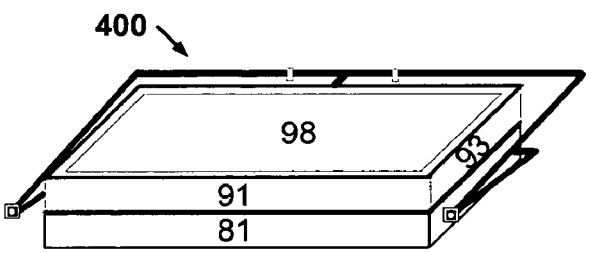

FIG. 38 is a perspective view of computer 400 in a closed position with screen facing upward.

Figure 39:
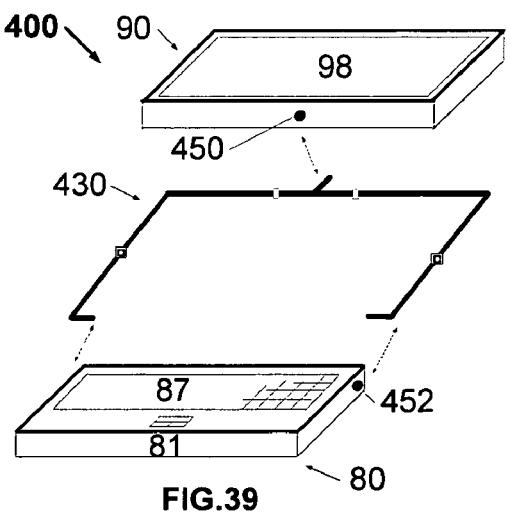

FIG. 39 is a perspective view of computer 400 when the arm is completely detached from base 80 and display 90.

Fifth Embodiment

Figure 40A:
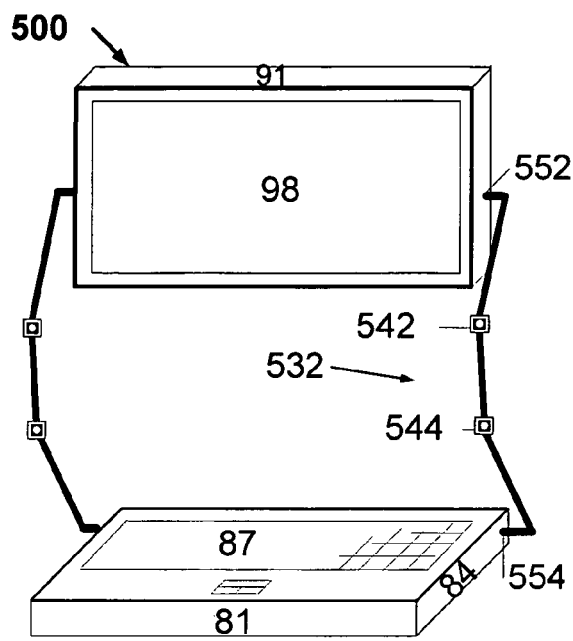

FIG. 40A is perspective view of the portable computer (500) of the fifth embodiment of the present invention. This embodiment has two triple-sectioned side arms. It is in a position where the screen is lifted and facing the user.

Figure 40B:
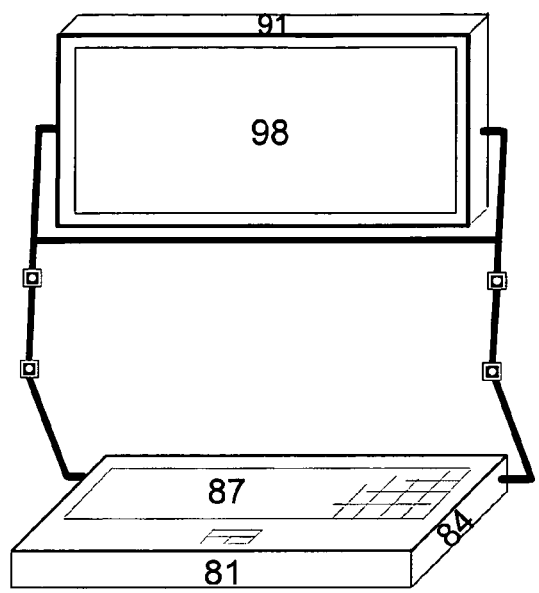

FIG. 40B shows a variation by adding a horizontal section that connects the left and the right arms in computer 500.

Figure 41A:
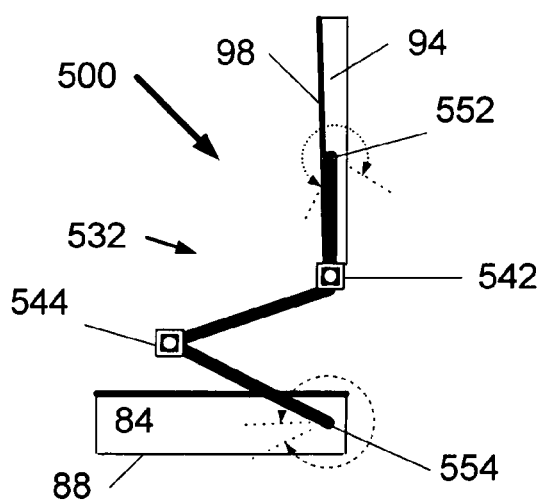

FIG. 41A is a perspective side view of computer 500.

Figure 41B:
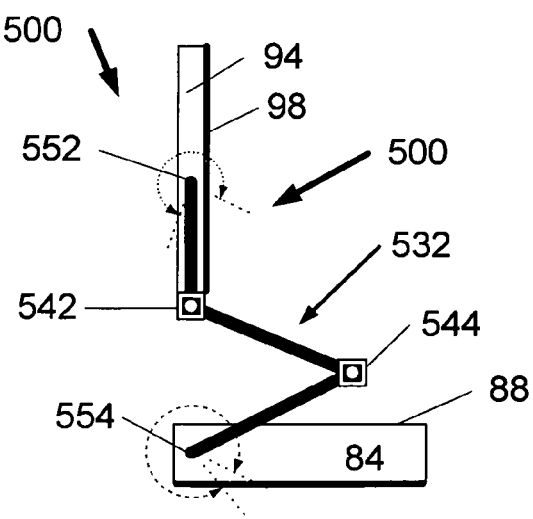

FIG. 41B is a perspective side view of computer 500 in a position where the screen is lifted and faced forward, and the keyboard is faced down. (This is for the stylus input configuration.)

Figure 42:
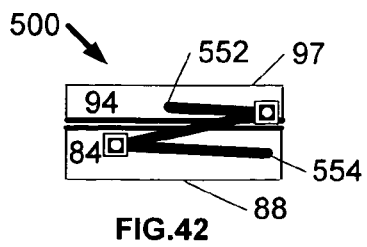

FIG. 42 is a perspective side view of computer 500 in a conventional closed position with arms folded.

Figure 43:
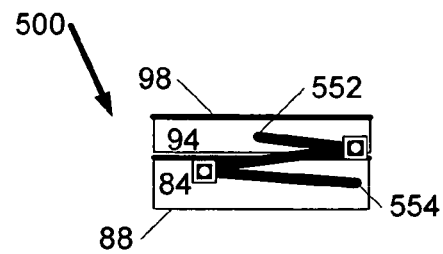

FIG. 43 is a perspective side view of computer 500 in a closed position with arms folded and screen facing up (for the tablet PC configuration).

Figure 44:
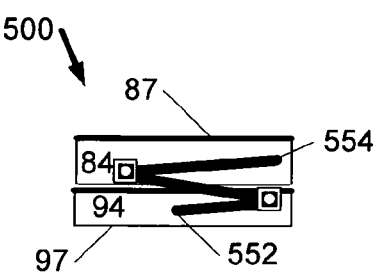

FIG. 44 is a perspective side view of computer 500 in a closed position with arms folded, base sitting on top of the display, and keyboard facing up (for space saving when the portable computer is used as a desktop machine).

Independent Motions for Screen Lifting and Screen Tilting

Figure 45:
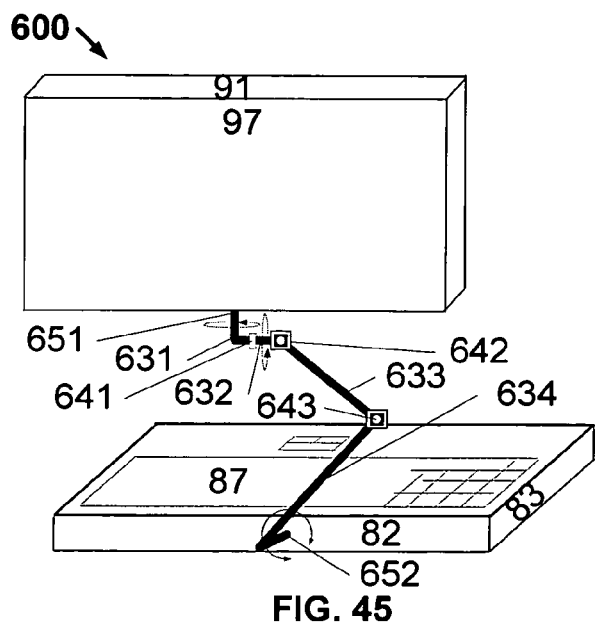

FIG. 45 shows a portable computer (600) according to a sixth embodiment of the present invention.

Figure 46:
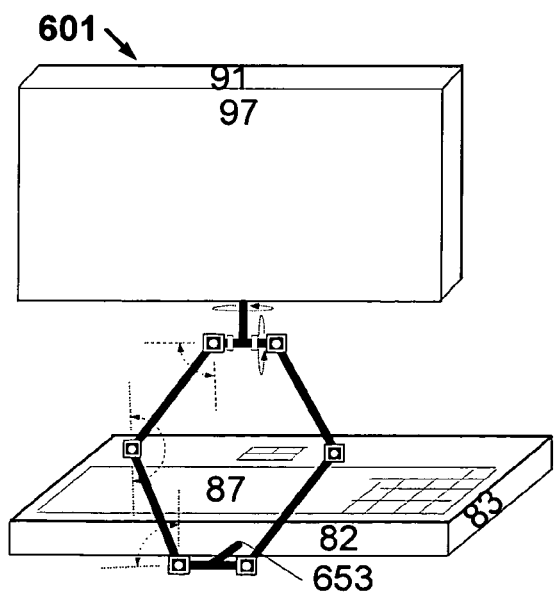

FIG. 46 shows a computer (601) that is a variation of computer 600 by adding symmetric sections to the arm to enhance stability.

FIG. 47 shows a computer (602) that is yet another variation of computer 600 by adding symmetric sections to the arm to enhance stability.

FIG. 48 shows a portable computer (700) according to a seventh embodiment of the present invention.

FIG. 49 is a back perspective view of computer 700 in a conventional open position.

FIG. 50 is a back perspective view of computer 700 in a close position.

FIG. 51 shows a computer (701) that is a variation of computer 700 by replacing the top portion of each arm.

FIG. 52 shows a computer (702) that is a variation of computer 700.

FIG. 53 shows a computer (703) that is a variation of computer 700.

Anti-Tipping and Base-Tilting

Figure 54A:
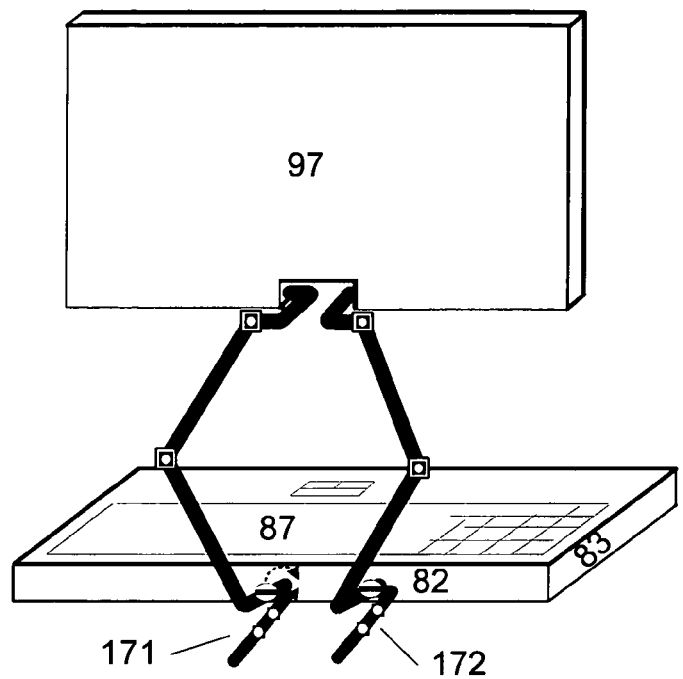
Figure 54B:
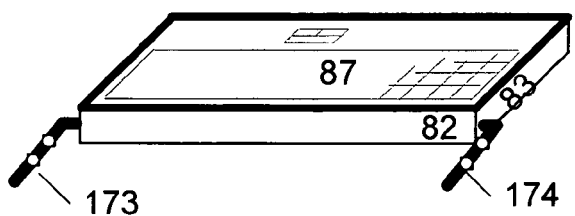
Figure 54C:
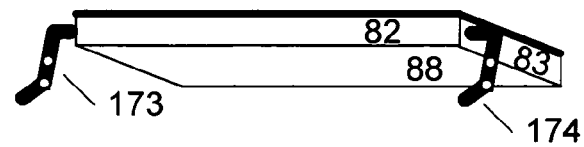

FIGS. 54A-54C shows that an anti-tipping and base-tilting mechanism can be added to a portable computer according to the present invention.

DETAILED DESCRIPTION OF THE PREFERRED AND ALTERNATIVE EMBODIMENTS

Drawing Notations

For convenience in the drawings of the embodiments of the computer according to the present invention, FIG. 1-FIG. 3 list some notations as short hands to represent arm sections, their linkage and relative movements, and their connections to the base and the display. It should be pointed out that only those used directly in the drawings are listed for illustration purpose, and that they do not represent all the possibilities enabled by the present invention.

FIG. 2 is a list of notations used in the drawings to show some of the possible relative rotations of the arm sections that are linked together.

FIG. 2A denotes a joint which allows the two attached sections to rotate around the joint; and they rotate on two parallel planes.

FIG. 2B denotes a joint which allows the two attached sections to rotate around the same axis; and they rotate on the same plane.

FIG. 2C denotes a joint which allows the two attached sections to independently rotate around the joint on a common plane; and the sections will not overlap in a folded position. (The point of view dictates which one of the two pictures to use in the drawings.)

FIG. 2D denotes a joint which allows the two attached sections to turn in relatively opposite direction.

FIG. 2E is perspective view of a combination of two joints and three arm sections. The purpose is to show how simple joints can be combined to allow more flexible rotations of the end sections. Around joint 841, arm section 831 can rotate in any selected plane; and the selected plane can change when arm section 832 turns (relative to arm section 833) around joint 842. If we look at the combination as a whole, the end sections 831 and 833 can turn independently on separate planes. That is, even when arm section 833 stays still, arm section 831 can turn on its own on a selected plane; and furthermore, this selected plane can change even when section 833 does not move. (In engineering implementation, if the middle section 832 is short, it may help to think of such a joint combination as just one combo-joint mechanism which allows the two attached end sections 831 and 833 to rotate independently. Therefore, we also have the notation of FIG. 2F.)

FIG. 2F denotes a joint which allows the two attached sections to rotate independently around two separate axes, and they rotate on two separate planes. There is more than one variation (two being shown here). The point of view dictates which variation to use in a drawing. In general, this type of joint is marked by a block circle containing two of the three symbols: a white vertical bar, a white horizontal bar, and a white circle, which are used to indicate the planes for the associated arm sections to rotate on. We generally use the white horizontal bar to indicate the associated arm section that can rotate on a plane parallel to the base of the portable computer. We use the white vertical bar to indicate the associated arm section that can rotate on a plane that is perpendicular to the base of the computer, and that the plane is invisible or reduced to a line from the perspective view point of the drawing. And we use the white circle to indicate the plane that is also perpendicular to the base of the computer, but the plane is at least partially visible from the perspective view point of the drawing. (This notation is somewhat analogous to the 3D coordinates. But it is not the same because the three planes here do not have to be perpendicular to one another. In engineering implementation, this type of joint can be substituted with a joint-combo such as FIG. 2E.)

FIG. 2G denotes a joint that allows arm section 821 to rotation around section 834.

FIG. 2H denotes a joint that allows arm section 822 to rotation around section 835.

FIG. 4A is a perspective view of the display of a portable computer in an upward position. Display 90 generally has two sides and four edges: viewing screen side 98, back side 97, upper edge 91, lower edge 92, left edge 93, and right edge 94 (from the user's normal view point).

FIG. 4B is a perspective view of the base of a portable computer. Base 80 preferably includes a central processing unit and other electronic components and a data entry member, such as a keyboard. Base 80 generally has two sides and four edges: upper side (keyboard) 87, bottom side 88, front or user edge 81, back edge 82, left edge 83, and right edge 84 (from the user's normal view point). The bottom side 88 can sometimes be used by an alternative data entry member, such as stylus input.

First Embodiment

FIG. 6 to FIG. 17 show a portable computer (100) according to a first embodiment of the present invention. Computer 100 has one single back arm.

FIG. 6A is a perspective view of the portable computer (100) of the first embodiment of the present invention. This embodiment includes a display 90, a base 80, and a multi-sectioned arm 130. One end section 131 of the arm is connected to the display at pivot 151; and the other end section 134 is connected to the based at pivot 152. Pivot 151 allows the display to rotate relatively around arm section 131; and pivot 152 allows the base to rotate relatively to arm section 134. Consequently the portable computer can be arranged into various configurations by controlling how display 90 and base 80 face each other. (Alternatively, such configurations can be obtained by simply detaching the arms, setting up the display and the base to the desired configurations, and re-attaching the arms again.) Arm sections 132 and 133 can rotate relatively around joint 143, as assisted by joint 142 and joint 144 (a function denoted as a white circle in the black circle), respectively. Together they allow the arm to control the continuous movement of pivot 151 (and thus the screen) within a selected plane. Besides, this selected plane can be changed continuously using a function of joint 141 (denoted as a horizontal white bar inside the black circle), together with its counterpart in joint 144. Therefore, the viewing screen's position can be adjusted continuously within a three dimensional space of semi-diameter equal to the total length of arm sections 132 and 133. The screen's viewing angle can be adjusted using the other function of joint 141 (denoted as a vertical white bar).

To maintain the display in a chosen spatial position such as the one shown in FIG. 6A, stabilizing mechanisms such as friction mechanisms and/or locking mechanisms can be employed at the joints (141, 142, 143, and 144) and the connection pivots (151 and 152). The friction mechanisms and the locking mechanisms can be built into the joints and connection pivots; and they can also be separate parts such as locking knobs, sliding locks and even latches and hooks. Also rotation-limiting mechanisms can be employed at the joints and connection pivots to prevent over turning (to avoid damage to the wiring cable inside the arm). The arm can be made controllably detachable from the display and base. When the display and the base are folded together, a locking mechanism (such as a latch and a hook lock) can be employed to prevent the display and the base from unintentional separation. (Note: the mechanisms discussed here are generally applicable to the portable computers according to the present invention. Therefore, we shall not repeat such as discussion in the presentations of other embodiments.)

FIG. 6B is the top portion the arm connected to the display of computer 100. This portion can be substituted by an alternative version as shown in FIG. 6C. One function of joint 141 (as in FIG. 6B) is to tilt the screen for different viewing angle; and this can be achieved by turning display 90 at the "T-shaped" arm section 138 (as in FIG. 6C). The ability for the display to turn around the end section 131 (as in FIG. 6B) can be achieved by turning the "T-shared" arm section at joint 147 (as in FIG. 6C). And the function of joint 142 in assisting the arm section 132 to turn (as in FIG. 6B) can be achieved by a function of joint 148 (denoted as a white circle in the black circle, as in FIG. 6C). And finally, one function of joint 141 as denoted by the horizontal white bar inside the black circle (as in FIG. 6B) can be achieved by the counterpart in joint 148 (as in FIG. 6C).

FIG. 6D is a computer (101) that is a variation of computer 100. In this variation, 131 and connection pivot 151 in FIG. 6A are replaced by sections 131a and 131b, joint 140, and connection pivot 150 (on the back side of the display). Notice that joint 140 serves the role previously served by pivot 151, and that the location connection 150 on the back of the display allows the display to rotate between landscape and portrait orientations.

FIG. 6E is a perspective back view of computer 101 when the screen is a portrait orientation.

FIG. 7 is a perspective view of computer 100 in a closed position. The arm is folded and parked alongside and parallel to the back edge of the base. This position can be obtained by folding arm 130 in FIG. 6A.

FIG. 8 is a perspective view of computer 100 in a conventional open position, with the folded arm parked alongside and parallel to the back edge (82) of the base. The folded arm leans toward the right side (from the user's point of view). This position can be obtained by lifting the end section 131 around joint 141 in FIG. 7.

FIG. 9 is a perspective view of computer 100 in a conventional open position with the folded arm parked alongside and parallel to the back edge (82) of the base. The folded arm leans toward the left side (from the user's point of view). This position can be obtained by swinging the arm sections simultaneously around 141 and 144 (using the functions denoted by the horizontal white bars inside the black circles) in FIG. 8.

FIG. 10 is a perspective view of computer 100 in a conventional open position, with the folded arm placed away from the base's back edge 82 (to avoid blocking the back edge 82 of the base for other uses, such as various cable outlets.) This position can be obtained by swinging the arm simultaneously using the functions denoted by the horizontal white bars in 141 and 144 in FIG. 8.

FIG. 11 is a perspective view of computer 100 in a position where the display is up-lifted, screen faced forward, and the arm being away from the back edge 82 of the base. This position can be obtained by opening up arm 130 in FIG. 10.

FIG. 12 is a perspective left side view of computer 100 in an opened, screen-up position, where the screen is away from its conventional vertical position towards the user. This position can be obtained by adjusting the rotation angles of 132 and 133 at joint 143 in FIG. 11.

FIG. 13 is a perspective view of computer 100 in an opened, screen-up position, where arm sections 132 and 133 are positioned near the back edge 82 of the base. This position can be obtained by lifting the end section 131 around joint 141 in FIG. 6A.

FIG. 14 is a perspective view of computer 100 in an opened, screen-up and backward facing position, with the folded arm parked alongside and parallel to the back edge (82) of the base. This position can be obtained from FIG. 8 by turning the screen to the back.

FIG. 15 is a perspective view of computer 100 in a closed position with viewing screen 98 faced upward (for the tablet PC configuration), and with the folded arm parked alongside and parallel to the back edge (82) of the base. This position can be obtained by closing down the display from FIG. 14.

FIG. 16 is a perspective view of computer 100 in an open position in which the viewing screen 98 is facing the front, and the whole display is lifted and positioned towards to the right side of the user (suitable for view sharing.) This position can be obtained by moving display 90 towards the right side (relative to the user) as shown in FIG. 13.

FIG. 17 is a perspective view of computer 100 in a closed position with the base sitting on top of the display (for the space-saving configuration). This position can be obtained from FIG. 13 in the following steps: Rotate base 80 around arm section 134 (connected at pivot 152) to let the keyboard face down; close the computer; and turn the computer down-side-up.

Second Embodiment

FIG. 18 to FIG. 27 show a portable computer (200) of a second embodiment of the present invention. Computer 200 has two double-sectioned side arms.

FIG. 18 is a perspective view of the portable computer (200) of the second embodiment of the invention. The computer has two double-sectioned side arms. It is in a position where the screen is lifted and facing the user. The portable computer 200 generally includes a display 90, a base 80, and two double-sectioned side arms 231 and 232. The left arm 231 is connected to the display at pivot 251, and to the base at pivot 253. The right arm 232 is connected to the display at pivot 252, and to the base at pivot 254. The viewing angle of the screen can be adjusted by rotating the display around pivot 251 and pivot 252. The double-sectioned arms can be adjusted synchronously through joints 241 and 242, thus allowing continuous adjustment of the display's position by height and depth (see Configuration (1) in the Background section). The range of adjustment can be as far as the length of the fully stretched arms. The portable computer can be arranged into various configurations by setting how the screen 98 and the keyboard 87 face each other; and this can be achieved by turning the base and display around the connection pivots (at 251, 252, 253, and 254). There are mechanisms to control how much the end sections of the arm can turn at pivots 251, 252, 253, and 254.

FIG. 19 is a perspective view of computer 200 in a closed, arms folded position. This position can be obtained by turning the screen face down and then folding the arms. It also shows how the arms can be detached. There are locks to prevent the arms from unintentional detachment from the base and the display.

FIG. 20 is a perspective view of computer 200 in conventional open position, with the folded arms parked alongside the left and right edges of the base, respectively.

FIG. 21 is perspective side view of computer 200 in a position with the screen up-lifted and faced forward. It shows how the display can rotate around arm at 252 and how the arm can turn relatively around the base at 254. (The left arm is not shown in this view.) These mechanisms allow the portable computer to transition from its current position to any of the configurations as shown in FIG. 24-FIG. 26.

FIG. 22 is a perspective side view of computer 200 in a conventional open position with arms folded and lifted up to avoid blocking the edge 84 of the base for other uses (such as a DVD player).

FIG. 23 is a perspective side view of computer 200 in an unconventional open position with arms partially stretched to reach behind the back edge of the base.

FIG. 24 is a perspective side view of computer 200 in an open position with display 90 up-lifted and the keyboard faced down (for the stylus configuration (4)). This position can be obtained from FIG. 21 by two steps: turn the base around pivot 254 to a face-down position; and then adjust 232.

FIG. 25 is a perspective side view of computer 200 in a conventional closed position with arms folded and screen facing the keyboard.

FIG. 26 is a perspective side view of computer 200 in a closed position with arms folded, screen facing up, and the base stacked underneath the display. (This is for the tablet PC configuration.) This position can be obtained from FIG. 21 in the following steps: Flip the base to make the keyboard face down (by rotating the base around pivot 254); fold the arm towards the right hand side in FIG. 21 (i.e. in the opposite direction to how the arm is normally opened and closed in the notebook configuration); and close down display (with screen facing up).

FIG. 27 is a perspective side view of computer 200 in a closed position with arms folded and screen facing up. (This is an alternative design to support the tablet PC configuration. In this special variation, the total length of each arm is somewhat restricted.)

Third Embodiment

FIG. 28 to FIG. 33 show a portable computer (300) of a third embodiment of the present invention. The third embodiment is an enhancement of the second embodiment by substituting the side arms in computer 200 with an enhanced pair of arms, in order to allow the display to move left or right relative to the base.

FIG. 28A is a perspective view of a portable computer (300) of the third embodiment of the present invention. The third embodiment is an extension of the second embodiment by substituting the side arms (231 and 232) in computer 200 with a different pair of arms as shown in FIG. 28B. Each of these new arms has two additional combo-joints 341 and 345 (also 342 and 346 on the other arm). The additional joints allow the middle sections of the arms to swing away from the side edges of the computer (300), and consequently enabling the display to move sideways, as shown in FIG. 33. This swinging movement uses the functions of the joints denoted by white horizontal bars inside the black circles (joints 341, 345, 342, and 346). And the white circles inside the black circles are for cooperation with middle joints 343 and 344 in folding and stretching of the long sections (333, 335, 334, and 336). In addition to sideways movement for the display (or adjustment by width as specified in Configuration (2) of the Background Section), computer 300 of the third embodiment retains all the allowable positions and configurations of computer 200 of the second embodiment.

FIG. 28B is a split view of arms 231 and 232 of computer 200 (as shown in FIG. 18) and an alternative pair of arms. Substituting the arms leads to the third embodiment of the present invention as shown in FIG. 28A.

FIG. 29 is a perspective view of portable computer 300 in a closed position, with the arms folded.

FIG. 30 is a perspective view of portable computer 300 in a conventional open position, with arms folded and parked alongside the left and right edges of the base (80).

FIG. 31 is a perspective view of portable computer 300 in an open position, with arms folded and reached out from the back of the computer. This position can be obtained from FIG. 28A by folding the arms (around joints 343 and 344) in the opposite direction from the way they are normally folded when the computer is in a close as shown in FIG. 29.

FIG. 32 is a perspective view of portable computer 300 in an open position, with arms folded, reached out first from the back of the computer, and then turned sideways away from the computer. This position can be obtained from FIG. 31 by turning the middle sections 333 and 335 around joints 341 and 345 on one arm, respectively (and also sections 334 and 334 around joints 342 and 346 on the other arm, respectively). This position places the sections 333 and 335, and 334 and 336 all on the same plane. This is a preparation for the position in FIG. 33.

FIG. 33 is a perspective view of portable computer 300 in an open position, with arms stretched, and with the display up-lifted and reached out towards the right hand side of the computer (from the user's point of view.) This position can be obtained from FIG. 32 by moving the arms sections simultaneously, 333 and 345 on one arm, and 344 and 346 on the other; and this simultaneous movement is possible when these four arm sections are on the same plane, a condition set up in FIG. 32.

Fourth Embodiment

FIG. 34 to FIG. 39 show a portable computer (400) according to a fourth embodiment of the present invention. Computer 400 has a bridge arm.

FIG. 34A is a perspective view of the portable computer (400) of the fourth embodiment of the present invention. This embodiment has one multi-sectioned bridge arm. It is in a position where the screen is lifted and facing the user. The portable computer 400 generally includes a display 90, a base 80, and a multi-sectioned bridge arm 430. The bridge arm sections 433 and 434 are attached to the based at pivots 451 and 452, respectively; and the middle section 439 is connected to the display at pivot 450. The viewing angle of the screen can be tilted by turning arm section 439 relatively to joints 441 and 442. The screen can rotate around pivot 450. Upper side arm sections 431 and 432 (similarly lower side arm sections 433 and 434) are adjustable synchronously. Adjusting the side arm sections allows continuous adjustment of the display's position by height and depth (Configuration (1) of the Background Section). The range of adjustment is limited by the length the side arm sections. The portable computer can be arranged into various configurations by setting how the screen 98 and the keyboard 87 face each other. There are locks to prevent the arms from unintentional detachment from the base and the display. (FIG. 39 shows how the arm can be completely detached from the base and the display.) There are also mechanisms to control how much the end sections of the arm can turn at pivots 450, 451, and 452.

FIG. 34B is a partial view of a variation that replaces the display and the bridge arm of computer 400.

FIG. 34C shows a variation of computer 400. In the variation, the bridge arm connects to the back edge of the base and to the left and right edges of the display.

FIG. 35 is a perspective view of computer 400 in the conventional open position.

FIG. 36 is a perspective view of computer 400 in the conventional closed position.

FIG. 37 is a perspective view of computer 400 in an open position with the arm folded and the screen facing away from the user. This position can be obtained from FIG. 35 by turning the display around the attached arm section at pivot 450.

FIG. 38 is a perspective view of computer 400 in a closed position with screen facing upward. This position can be obtained from FIG. 37 by closing down the display.

FIG. 39 is a perspective view of computer 400 when the arm is completely detached from base 80 and display 90.

Fifth Embodiment

FIG. 40 to FIG. 44 show a portable computer (500) according to a fifth embodiment of the present invention. Computer 500 is an enhancement of computer 200 by adding an additional section to each of the two side arms. The purpose is to show that it is possible to have side arms with more than two sections.

FIG. 40A is a perspective view of computer (500) having two triple-sectioned side arms. It is in a position where the screen is lifted and facing the user. The portable computer generally includes a display 90, a base 80, and two triple-sectioned side arms attached to base and the display on their left and right sides. The adjustability of the display and the allowable configurations of this portable computer are similar to those of portable computer 200. FIG. 41A shows how the arm sections, joints, and pivots can be adjusted. It allows the portable computer to transition from its current position to a variety of the positions shown in FIG. 41B-FIG. 44. (Computer 500 has four pivotal axes for the relative rotations of the arms sections, the display and the base.)

FIG. 40B shows a variation by adding a horizontal section that connects the left and the right arms in computer 500. This turns the two separate arms into a single bridge arm that connects the left and right edges of the base and the display. In practical application, this added horizontal section may enhance the stability of arm structure.

FIG. 41A is a perspective side view of computer (500).

FIG. 41B is a perspective side view of computer 500 in a position where the screen is lifted and facing the user; and the keyboard is facing down. (This is for the stylus input configuration.) This position can be obtained from FIG. 41A by the following steps: turn the base around pivot 554; stretch the lower two sections of arm and then partially fold them back in the opposite direction around joint 544; turn the display around pivot 552.

FIG. 42 is a perspective side view of computer 500 in a closed position with arms folded.

FIG. 43 is a perspective side view of computer 500 in a closed position with arms folded and screen facing up (for the tablet PC configuration).

FIG. 44 is a perspective side view of computer 500 in a closed position with arms folded, base sitting on top of the display, and keyboard facing up (for space saving when the portable computer is used as a desktop machine).

Independent Motions for Screen Lifting and Screen Tilting

In this section, we present several embodiments of the portable computer according to the present invention. These embodiments have a special feature: the motion for tilting the screen viewing angle (up to face to user, and down to face the base) and the motion for lifting the display relative to the base are basically independent, because the rotational axis for supporting these two motions are non-parallel to each other. (In many cases, these axes are perpendicular to each other.) This feature makes the arm mechanisms simple to implement and easy to use.

FIG. 45 shows a portable computer (600) according to a sixth embodiment of the present invention. By relatively rotating arm sections 633 and 634 around joint 643 and connection pivot 652, the arm can stretch and bend and therefore respectively move the display up and down, and left and right, relative to the base. By rotating arm section 631 around joint 641, the screen viewing angle can be tilted (up towards the user, and down towards the keyboard 87). The display can rotate (left and right) around section 631 at connection pivot 651; and therefore when the display and the base are folded together, the screen can be turned to either face the base (as in a conventional notebook close position) or face away from the base (as in the Tablet Configuration). One feature of this embodiment is that the motion for tilting the screen viewing angle (up and down) and the motion for stretching and bending the arm are basically independent; because, in this embodiment, the rotational axes (through joint 641) for supporting screen viewing angle tilting and the axes (through joint 643) for lifting the screen are perpendicular to each other. Since the base can also rotate around the end of section 634 at connection 652, the keyboard can be set to either face up or face down (as in a stylus input configuration).

Computer 600 has five pivotal axes for the relative rotations of the arms sections, the display and the base. Notice that if connection pivot 651 is replaced by a non-rotatable connection, then the computer will have four pivotal axes, and will be less flexible; but it will still support the opening, folding, tilting, and lifting of the display.

FIG. 46 shows a computer (601) that is a variation of computer 600 by adding symmetric sections to the arm to enhance stability. This variation retains the feature that the motion for tilting the screen viewing angle (towards the user or towards the keyboard) and the motion for lifting and lowering the display relative to the base are basically independent. Note: 653 can be either a fixed connection for stability or a pivotal connection if there is a need to support the stylus input configuration.

FIG. 47 shows a computer (602) that is yet another variation of computer 600 by adding symmetric sections to the arm to enhance stability. This variation retains the feature that the motion for tilting the screen viewing angle (up and down) and the motion for lifting and lowering the display relative to the base are basically independent. Connections 654 and 655 are pivotal.

FIG. 48 shows a portable computer (700) according to a seventh embodiment of the present invention. This computer has two separate arms with similar structures. Here we shall describe only the right arm (from the user's perspective), and left arm functions similarly. The right arm connects to the display at fixed connection 751 and to the base at pivotal connection 752. Arm sections 731 and 732 can relatively rotate around joint 741; this rotation supports the tilting of the screen viewing angle. Arm sections 733 and 734 can relatively rotate around joint 743; and this rotation supports the lifting and lowering of the display relative to the base.

FIG. 49 is a back perspective view of computer 700 in a conventional open position, with the folded arm parked alongside the back edge (82) of the base.

FIG. 50 is a back perspective view of computer 700 in a close, also with the folded arm parked alongside and parallel to the back edge of the base.

FIG. 51, FIG. 52, and FIG. 53 show three variations of computer 700, respectively labeled 701, 702, and 703. In each of these variations, the arms are connected to the display using connection pivots. The capabilities of the arm mechanisms in computer 700, 701, 702, 703 are similar.

Anti-Tipping and Base-Tilting

FIG. 54 shows that an anti-tipping and base-tilting mechanism can be added to a portable computer according to the present invention. FIG. 54A shows that extensions (171 and 172) can be added to the arms. FIG. 54B shows that an anti-tipping can also be attached to the base. (173 and 174 are rotatably attached to the base.) FIG. 54C shows that 173 and 174 can also serve as a base-tilting mechanism. Note: In an anti-tipping and base-tilting mechanism according to the present invention, the extensions (such as 171, 172, 173, and 174) and their attachment to the computer can be rotatable, slidable, foldable, unfoldable, extendable, retractable, elongatable, shortenable, controllably detachable, etc. It should be pointed out that the anti-tipping and base-tilting mechanism presented here can be incorporated to any portable computer according to the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A portable electronic device comprising:
   (a) a base having one or more input surfaces;
   (b) a display with a viewing area;
   (c) an arm having two or more sections linked together, wherein at least two said linked sections are relatively rotatable; and
   (d) said arm is connected to said base and also connected to said display;
   wherein said arm has a motion that is capable of opening and folding said display from and against said base, moving said display up and down in elevation relative to said base through relative rotations of some of said linked arm sections around rotational axes, at least one of which is horizontal; and when said display is in a position substantially elevated and having the same viewing orientation as a conventional viewing position, the viewing angle of said display can be tilted around a horizontal tilting axis that is substantially non-parallel to at least one said rotational axis that is horizontal.

2. The portable electronic device of claim 1, wherein when said display is in an open viewing position, said display is allowed to move to the left or the right direction relative to said base in a predefined usage orientation.

3. The portable electronic device of claim 2, wherein when said display is in an open viewing position, said display is further allowed to move forward and backward relative to said base in a predefined usage orientation.

4. The portable electronic device of claim 1, wherein at least two of the rotational axes for the relative rotations of said arm sections, said display, and said base are substantially non-parallel to each other.

5. The portable electronic device of claim 4, wherein at least two of said rotational axes are about perpendicular to each other.

6. The portable electronic device of claim 4, further comprising an anti-tipping mechanism for supporting the balance of said portable electronic device in an open position.

7. The portable electronic device of claim 1, further comprising a base-tilting mechanism by which said base can be partially lifted and tilted.

8. The portable electronic device of claim 1, wherein when said display is in an upright viewing position, the viewing angle of said display can be tilted around a vertical axis.

9. The portable electronic device of claim 1, wherein said display can be set to a portrait orientation.

10. The portable electronic device of claim 1, wherein at least one said arm is controllably detachable from said display or said base or both.

11. The portable electronic device of claim 1, wherein there are at least four pivotal axes for the relative rotations of arm sections, said display, and said base.

12. The portable electronic device of claim 11, wherein the wiring between said display and said base runs through at least one said arm.

13. The portable electronic device of claim 11, further supporting at least one feature selected from the following group:
   (a) When said base and said display are folded together, said viewing area can be arranged to face away from said base;
   (b) When said base and said display are folded together, each said input surface of said base can be arranged to face away from said display;
   (c) In a conventional open viewing position in which said display is not elevated above said base and is about perpendicular to said base, each said input surface of said base can be arranged to face upward.

14. The portable electronic device of claim 1, wherein said base has a back edge relative to the conventional usage orientation; and wherein when said display and said base are folded together, main portion of said arm can be folded and parked alongside and parallel to said back edge of said base.

15. The portable electronic device of claim 1, wherein said base has a back edge relative to the conventional usage orientation; and wherein in a conventional open viewing position in which said display is not elevated above said base and is about perpendicular to said base, main portion of said arm can be folded and parked alongside said back edge of said base.

16. The portable electronic device of claim 1, wherein said arm is connected to said base and said display in one of the following ways:
   (a) said display is directly connected to only one said arm section; and said base is directly connected to at least two said arm sections;
   (b) said display is directly connected to at least two said arm sections; and said base is directly connected to only one said arm section.

17. The portable electronic device of claim 1, wherein some of the relative rotations of said arm sections, said display, and said base are limited within predetermined ranges.

18. The portable electronic device of claim 1, wherein said display is directly connected to at least two said arm sections; and said base is directly connected to at least two said arm sections.

19. A portable electronic device comprising:
   (a) a base having one or more input surfaces;
   (b) a display; and
   (c) one or more arms connecting said base and said display, each said arm comprising two or more rotatably linked sections;
   wherein said one or more arms have a motion that is capable of opening and folding said display from and against said base, moving said display away from said base along a straight line direction through relative rotations of some of said linked arm sections around rotational axes, and when said display is in a conventional open viewing position, the viewing angle of said display can be tilted around a horizontal tilting axis that is substantially non-parallel to at least one of said rotational axes.

20. The portable electronic device of claim 19, wherein when said display is open for viewing, the viewing angle of said display can be tilted around a rotational axis that is substantially perpendicular to at least one of the axes for the relative rotations of said linked arm sections.

21. The portable electronic device of claim 19, wherein said electronic device comprises two arms.

22. The portable electronic device of claim 19, wherein there is at least one pair of rotatably linked arm sections, in which each said section has an end that is not linked to the other section in the pair; and said two section ends can move toward and away from each other along a substantially straight line.

23. A portable electronic device comprising:
   (a) a base having one or more input surfaces;
   (b) a display; and
   (c) an arm connecting said base and said display, comprising two or more rotatably linked sections that rotate relatively around one or more horizontal rotational axes;
   wherein said arm has a motion that is capable of opening and folding said display from and against said base, moving said display up and down along a single direction, wherein from a position where said display is folded on top of said base, said display can turn, around a horizontal tilting axis, into a conventional viewing position, in which said tilting axis is not parallel to at least one of said horizontal rotational axes.

24. The portable electronic device of claim 23, wherein the wiring between said display and said base runs through said arm.

* * * * *